United States Patent [19]

Dunn

[11] Patent Number: 4,813,013

[45] Date of Patent: * Mar. 14, 1989

[54] SCHEMATIC DIAGRAM GENERATING SYSTEM USING LIBRARY OF GENERAL PURPOSE INTERACTIVELY SELECTABLE GRAPHIC PRIMITIVES TO CREATE SPECIAL APPLICATIONS ICONS

[75] Inventor: Robert M. Dunn, Woodbridge, Conn.

[73] Assignee: The Cadware Group, Ltd., New Haven, Conn.

[*] Notice: The portion of the term of this patent subsequent to Apr. 7, 2004 has been disclaimed.

[21] Appl. No.: 945,371

[22] Filed: Dec. 22, 1986

Related U.S. Application Data

[63] Continuation of Ser. No. 585,535, Mar. 1, 1984, Pat. No. 4,656,603.

[51] Int. Cl.⁴ .................. G06F 3/153; G06F 15/40
[52] U.S. Cl. ...................... 364/900; 364/488; 364/521; 340/721; 340/747
[58] Field of Search ... 364/200 MS File, 900 MS File, 364/513-515, 521; 340/721, 747, 750, 799

[56] References Cited

U.S. PATENT DOCUMENTS 4,315,315 2/1982 Kossiakoff .................. 364/300
4,455,619 6/1984 Masui et al. .................. 364/900
4,546,435 10/1985 Herbert et al. .................. 364/300

Primary Examiner—David Y. Eng
Attorney, Agent, or Firm—Kramer, Brufsky & Cifelli

[57] ABSTRACT

An interactive rule based system enables problem solutions to be generated in schematic diagram form. A methodology designer selects and arranges graphic primitives using a graphics terminal to create a library of icons. Under control of a computer processor, the methodology designer is prompted to identify, by way example, parameters for using each icon. The system generates and stores a specific set of rules pertaining to the use of each icon on the basis of the parameters identified. The stored rules are cross-referenced to the icon to which they pertain, so that whenever the icon is selected by a problem solving user for use in building a problem solution, the rules pertaining thereto will be accessed and applied. A methodology designer can also select and concatenate functions to each other and to icons to create more complex functions for use in building problem solutions. New functions can also be created in the form of truth tables which establish a transfer function across an icon. By accessing and selecting icons and functions created by a methodology designer, a problem solving user can build a solution to a problem by graphically coupling the icons and functions together on a chart.

15 Claims, 12 Drawing Sheets

Microfiche Appendix Included
(3 Microfiche, 200 Pages)

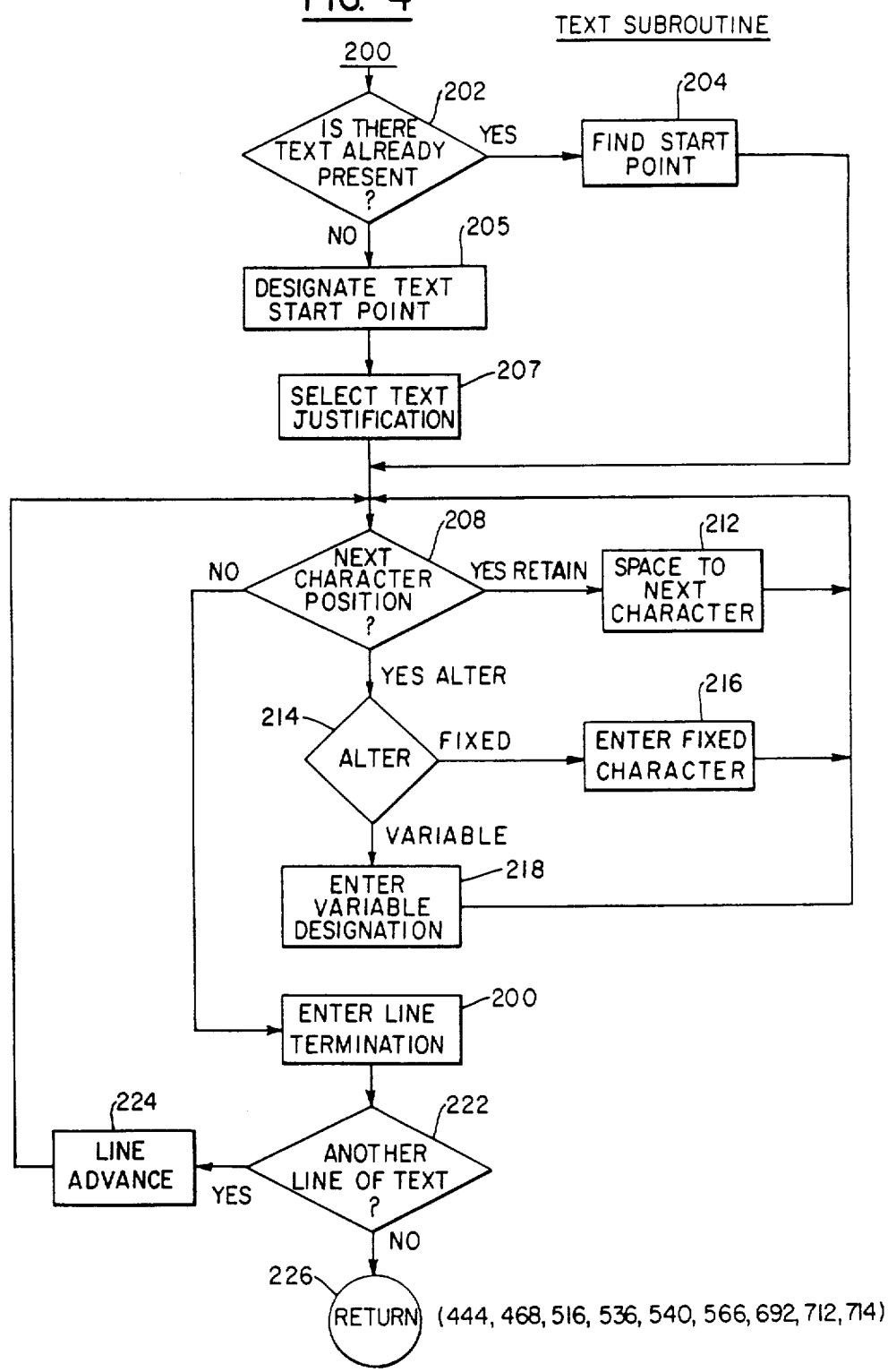

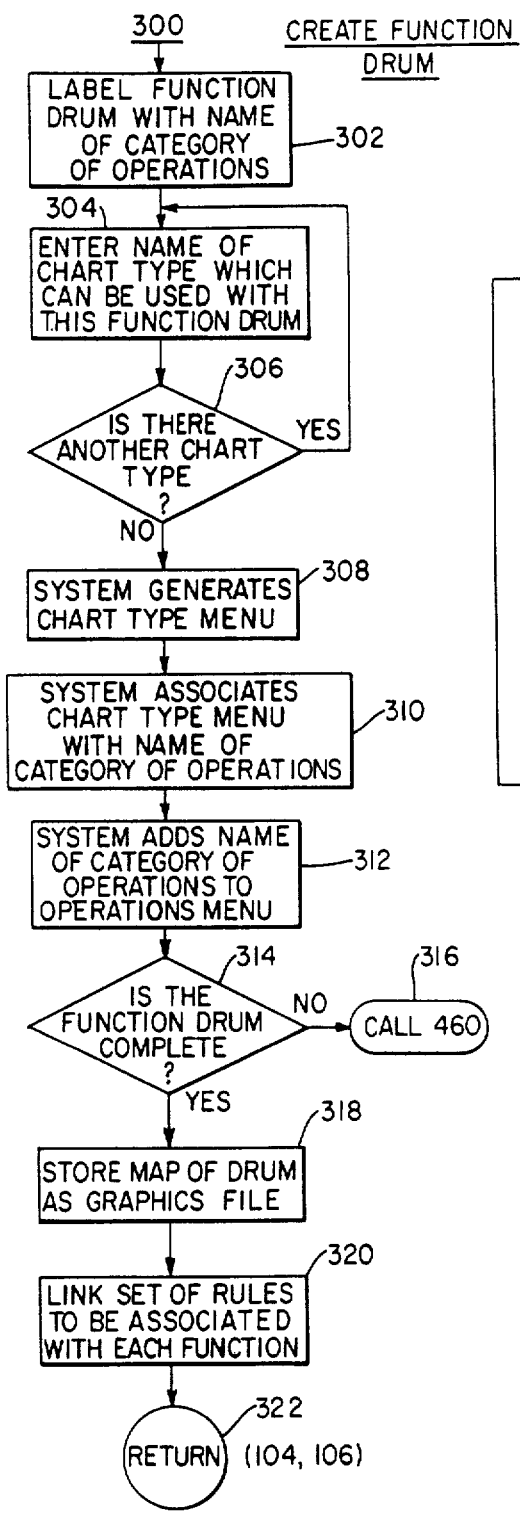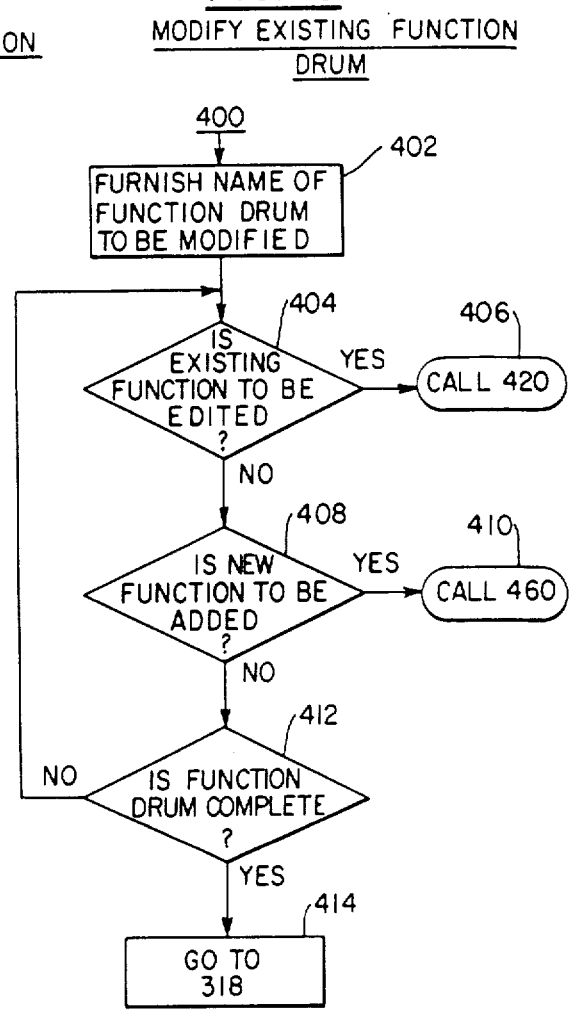

ADD NEW FUNCTION

PROMPTING OF OPEN ENDED CONNECTORS

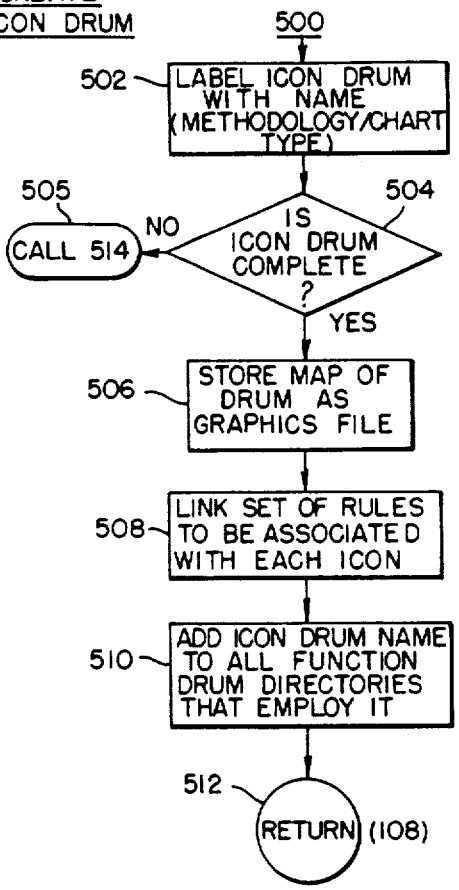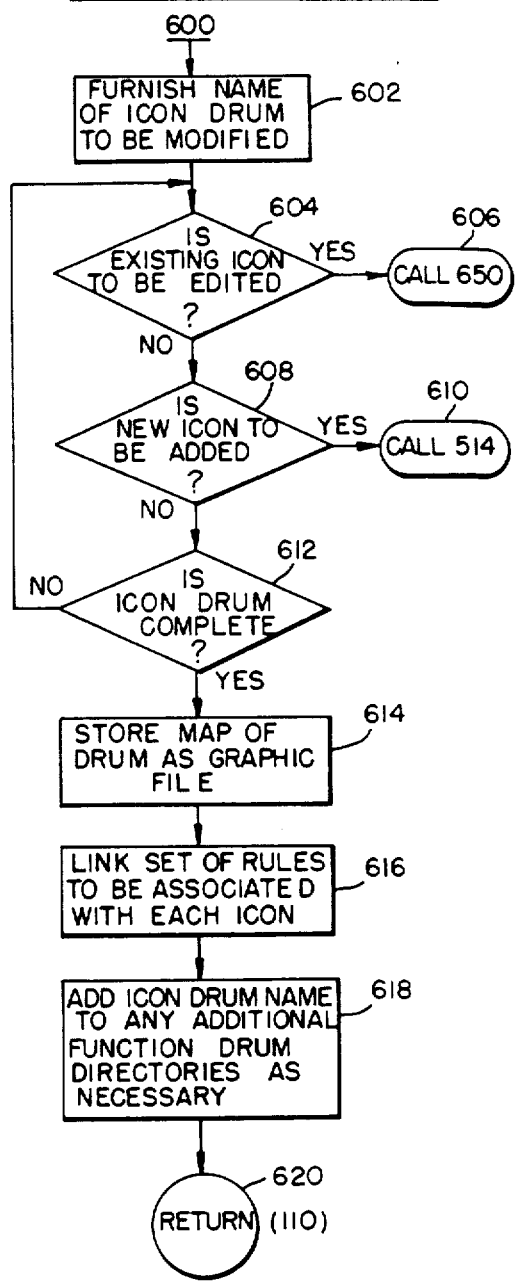

EDIT EXISTING ICON

PSEUDONYM-SUBROUTINE

| ADD | DELETE | MOVE | COPY | FIT | SIZE | REROUTE |

# 4,813,013

SCHEMATIC DIAGRAM GENERATING SYSTEM USING LIBRARY OF GENERAL PURPOSE INTERACTIVELY SELECTABLE GRAPHIC PRIMITIVES TO CREATE SPECIAL APPLICATIONS ICONS

This application is a continuation of application Ser. No. 585,535 filed on Mar. 1, 1984, now U.S. Pat. No. 4,656,603 which issued Apr. 7, 1987.

BACKGROUND OF THE INVENTION

The present invention relates to computer systems and more particularly to a new type of interactive computer system for enabling a problem solving user to create (i.e. plan and evaluate) solutions to problems by building schematic diagrams representative of the solutions. The system of the present invention is useful in designing solutions which lend themselves to symbolic representation, e.g. in the form of schematic diagrams such as flow charts, process diagrams, and the like. Examples of designs which utilize such solutions are the layout of assembly lines for product manufacturing, the design of computer systems, computer software design, and the design of refineries and chemical plants. The interactive computer system disclosed herein also has application to the creation and use of "smart forms", e.g. for income tax reporting purposes, which are capable of satisfying the unique requirements of any problem solving user.

Past attempts to develop computer systems which are capable of creating problem solutions have been implemented through artificial intelligence techniques. Artificial intelligence is the branch of computer science that attempts to make machines emulate intelligent behavior. There has been success in enabling a computer to reason from knowledge in a limited domain, and in some instances computer programs implementing artificial intelligence techniques can exceed human performance. Such programs use a collection of facts, rules of thumb, and other knowledge about a given field, coupled with methods of applying those rules, to make inferences. These programs have been applied to such specialized fields as medical diagnosis, mineral exploration, and oil-well log interpretation. Since such programs often must make conclusions based on incomplete or uncertain information, they differ substantially from conventional computer programs which solve problems in accordance with pre-defined algorithms and complete data sets. The power of such systems results from entering large amounts of knowledge into the computer. It is such knowledge data, and not sophisticated reasoning techniques, that is responsible for the success of such "expert" systems. An introduction to such systems is provided in the article entitled "Expert Systems: Limited But Powerful", by William B. Gervarter, *IEEE Spectrum*, August, 1983, pgs. 39-45.

One problem with knowledge based expert systems is the vast amount of data which must be entered into the computer in order to provide a useable system. The more knowledge a system is given, the better will be its solution. There is a tradeoff, however, because greater search time is required when more information is entered into the system. Other drawbacks to such systems are their narrow domain of expertise, the requirement that problem solving users describe problems in a strictly defined formal language, and the extensive training required to teach problem solving users to use such systems.

The present invention provides a general purpose machine for designing problem solutions which can be represented in schematic diagram form, and avoids many of the problems associated with prior knowledge based systems. Although the system can be used to build problem solutions in any field in which solutions can be represented in schematic form, the system will be described herein primarly with reference to the automation of the process used by programmers, data processing analysts, and system methodology designers to create computer software for commercial applications. The description of the invention in connection with the creation of computer software is not intended to limit the scope of the invention in any manner. Those skilled in the art will appreciate that as a general purpose system, the apparatus and techniques of the present invention will have broad application to the design of problem solutions in any field where such solutions can be represented in schematic diagram form.

Current methods of software design are time consuming and unsuitable for collaboration between many people. It would be advantageous to provide tools for software creation professionals which allow them to employ techniques derived from the world f computer aided design and engineering. These techniques would be utilized to create the logical analysis of the system whose design is being sought, to plan the solution itself, to identify the parts of the solution that can be implemented as independent modules, to identify the elements of communication between such independent modules in the solution's implementation, to design the independent solution components, and to test for their logical correctness prior to actually including the design solutions in a computer program. It would also be advantageous to be able to utilize functional modules previously designed in the context of other solutions for other problems, in the solution effort for the problem at hand. Such re-utilization of previously developed modules would increase the efficiency of the design process. The present invention relates to such a system.

In the system of the present invention, problem solutions can be generated in schematic diagram form in accordance with certain methodologies. The solutions are such that information can be extracted from a design at a graphical level and be used as the basis for subsequent input to automatic code generation tools or other automated functions, such as the generation of masks for fabricating integrated circuits. The system enables problem solving users to initially sketch what they conceive to be their current notion of a possible solution strategy. This mode of system use is referred to as the "chart" mode. After the sketching process has led to some degree of satisfaction and acceptance of the solution strategy, a formal rule-based schematic of the solution can be created which logically conveys each aspect of the solution prior to its implementation. The creation of such schematics occurs at the "schematic" level of the system. The formal schematic is then reviewed by the system to verify that it is correct with regard to all of the internal formal rules, details and mechanisms of the methodology that is employed to create it.

A key function of the present invention is the provision of means for enabling a methodology designer to create a library of logically or methodologically based schematic symbols, or graphic icons, and related formal functions which govern the employment and manipulation of the graphic icons when combined into a problem solution. The icons and functions are created by the methodology designer on an interactive basis with the system. Thus, during the creation of such icons and functions, the system prompts the methodology designer to identify, by way of example, the parameters and use of each icon or function. On the basis of these parameters, the system generates and stores a specific set of rules for each and every icon and function which completely and logically establish how each icon and function can be used to build problem solutions. In prompting a methodology designer to identify such parameters, the system requires the methodology designer to provide examples as to how the icon or function being created can be connected to other icons and/or functions. Such examples enable the system to generate the specific rules for the use of the icons and functions. Thus, the rules are built "by way of example".

As noted, the methodology designer can create new graphic icons and new formal functions. The new functions can be represented either in a text format or symbolically as "function icons". Such new functions can be built in three ways, to be explained hereinafter in detail. In general, these three methods comprise (1) concatenating function primitives already stored in the system; (2) concatenating function primitives with other existing complex functions; and (3) creating value tables for a function icon by assigning input and output values to all of the open ended connectors present on the function icon, which values are used by the system to establish a transfer function across the icon. The types of values which can be assigned when creating value tables are actual numerical values, indirect values (i.e., pointers to actual values), and inputs or outputs of other functions.

Unlike prior knowledge based systems, which require the entry and storage of a vast amount of information, the system of the present invention builds rules on the basis of procedure within a field of intent. Each such field of intent may be represented by its own library of icons and functions within the system. The system thereby precludes interference between intents. Since a methodology designer can create unique sets of icons and functions to accomplish desired intents from axiomatic primitives stored in the system, a truly general purpose machine results. Once a methodology designer creates a special library of icons and functions for a desired application (i.e., intent), the system can then accommodate any problem solving user who desires to build problem solutions for that application in schematic diagram form. The methodology designer has complete control over what applications the system can be used for and in the definition of the methodology to be used in building solutions for those applications. This is a substantial advance over prior systems, which can be used only for the creation of problem solutions according to an established methodology in the specific field in which the machine is "knowledgable".

SUMMARY OF THE INVENTION

In accordance with the present invention, an interactive rule based system is provided for generating problem solutions in schematic diagram form. The system operates and can be interfaced with on several levels. A first level of operation is engaged in by a "problem solving user", who builds schematic diagrams for applications available through existing machine functions. The first level problem solving user has an inventory of such functions, arranged in libraries or sets on a function drum, and an inventory of icons, arranged in libraries or sets on an icon drum and that together provide the building blocks necessary to use the system for an intended application.

A second, higher order level of operation is engaged in by a "methodology designer" who actually creates the libraries of functions and icons that are available to the problem solving. It will be understood that the methodology designer and problem solving user can be the same or different persons; the role of each, however, is quite distinct. The methodology designer, through interactive use of the system, actually establishes the methodologies that govern the building of schematic diagrams by the problem solving user. The present invention is primarily concerned with this second level of operation, and in particular with the unique tools provided for use by the methodology designer.

The system includes a computer processor, a graphics terminal coupled to the processor, and means for providing a multi-portion split display on the graphics terminal. A plurality of functions and graphic and functional primitives are stored in the computer processor. Means are provided for enabling a methodology designer to employ the functions and select and arrange the graphic primitives using the graphics terminal to create a library of icons. Means operatively associated with the computer processor are provided for prompting a methodology designer to identify, by way of example, parameters which define each icon and its use. The system generates and stores a specific set of formal rules pertaining to the nature and use of each icon on the basis of the parameters identified. The stored formal rules are cross-referenced to the icon to which they pertain, so that whenever the icon is selected by a problem solving user for use in building a problem solution, the formal rules pertaining thereto will be accessed and applied.

In order to provide a friendly and consistent interface for a problem solving user, means are provided for symbolically displaying, in one portion of the split display, an icon drum comprising a set of icons from the icon library created by the methodology designer. Each such set of icons relates specifically to a category of formal schematic diagrams. Similarly, a set of functions is displayed on a function drum in another portion of the split display. Each such set of functions relates specifically to a category of operations applicable to the category of schematic diagrams which can be created from the icons displayed on the icon drum. Means are provided for enabling a problem solving user to access and select icons and functions displayed on the icon and function drums, and to build a solution to a problem by functionally arranging and coupling icons together on a chart work area portion of the split display. The system insures that the functional arrangement and coupling of icons is made strictly in accordance with the formal rules that apply to each of the icons so arranged and coupled and the functions which are employed to do so.

The system of the present invention can further comprise means for enabling a methodology designer to select and concatenate functions to each other and to icons, using the graphics terminal, to create more complex functions for display on the function drum. The complex functions can subsequently be used by a problem solving user to build problem solutions in the corresponding area of intent (i.e., for the corresponding application). Further, in order to create new functions, the system will analyze any new function icons created by a methodology designer to identify open ended connectors, and prompt the methodology designer to assign input or output values to the open ended connectors that become part of the employment rules for the later use of the function icon analyzed. The input and output values assigned by the methodology designer establish a transfer function across the function icon. The function icon and values, in combination, form a new function for display on the function drum and for subsequent use in building problem solutions.

In prompting a methodology designer to identify, by way of example, the defining parameters for the intended use of each graphic or function icon, the system requires the methodology designer to define the points of connection to each icon. Further, the methodology designer is required to indicate, for each connection point, whether the point is an input, an output, or a bidirectional port. A methodology designer is also required to indicate the connector line styles (e.g., dotted, dashed, solid line, etc.) which are permitted to be connected to each connection point, and to indicate the connector line types (e.g., line, arc, polyline, etc.) which are permitted to be connected to each point. In addition, the methodology designer is required to indicate, through system prompts, what other objects (e.g. icons or functions) are permitted to be connected, through a connector, to each connection point. Other system prompts require a methodology designer to identify whether any annotation is to be associated with a connector, and if so, what type of annotation is to be permitted. In order to complete the formal rules which define the proper use of each icon, the methodology designer is required to identify any fixed and variable text and other forms of annotation which are to be associated with each icon.

By establishing a list of formal rules for the use of each icon and function, the system is able to enforce the rules during the building of problem solutions. Thus, when a problem solving user functionally arranges and couples different icons together at the first level of system operation to create a problem solution, the system continuously verifies that all of the formal rules for the particular icons being used and functions applied are complied with.

Any input means well known in the art can be used to enable a problem solving user or a methodology designer to interface with the system. In a preferred embodiment, an input device known as a "mouse" is used to enable the selection of functions and icons and their placement on the chart work area of the graphics terminal, and a keyboard is used to enable text and numbers to be input.

The system of the present invention is an intentional system. It is a procedural rule based expert system, and not knowledge based with inference rules as are most prior artificial intelligence expert systems. By creating new icons and functions, and inputting the parameters which establish the formal rules for each icon and function, a methodology designer can customize the system for any intended purpose. Thus, a methodology designer could develop icons and functions to enable the system to be used by a problem solving user to build flow charts for computer software creation, to create process flow diagrams for chemical engineering problems, to create schematic diagrams for electrical engineering problems, or to create any other type of chart which can be used to build solutions to specific problems.

The formal rules established for the system are axiomatic and, as such, the system is closed, complete, and consistent. Such formal rules are never modified or broken to fill a special need; once established there can be no exceptions to their application when the associated icons or functions are used by a problem solving user. Thus, those skilled in the art will recognize that the system of the present invention is significantly different from any computer implemented problem solving or design system known heretofore. In particular, such prior art systems operate in accordance with heuristic techniques (i.e. analogical, allegorical, metaphorical, and paradigmatic) and not the formal logical techniques (i.e. procedural, inductive, abductive, and deductive) applied in the present system. Heuristic based systems utilize rules of thumb or empirical knowledge to guide a problem solution and are judgmental in nature. Thus, they often result in ad hoc solutions which are not entirely consistent with past results. In the present system, the establishment of and adherence to formal rules insures consistency and provides a truly general purpose machine with which a methodology designer can implement any desired intent.

Since the system enables the creation of icons and functions which are each associated with specific formal rules within an intent, and the rules are always consistently enforced at all levels of system operation, problem solutions generated by the system can easily be supported and analyzed at various levels. For example, program description information can be extracted from a completed solution and be entered into a program description file for subsequent use in executing the problem solution. Thus, in the case of software creation, the extracted program information could be used by automatic code generators to produce actual software code. In the case where masks for integrated circuits are to be created, the program description information can be used to drive mask generators.

Information which can be extracted from problem solutions generated by the system of the present invention includes data of several kinds. For example, if the problem solution generated concerns the creation of computer software, control information will be extracted which governs the operating environment required for successful execution of the program when it has been converted into executable code. Also, the formal procedural description of the logical functioning of the program will be extracted, along with the formal description of the data types of the information employed within the program. If a problem solution concerns data flows rather than program flows, equivalent extractions could be made for use in a data description file as opposed to a program description file. The extraction of data from data files for future use is a process well known to those skilled in the art. In the present instance, extraction of information can be used to support requirements analysis of problem solutions to be generated, for decision support functions, to provide functional analysis of a solution which has been created, to provide classification and reclassification of extracted properties, to enable relational analysis, and to explore new applications (new rules) for the system. While the present invention is not concerned with any of these applications per se, it is important to recognize that the logical techniques used by the present system make the future provision of such applications obtainable in a straightforward manner.

BRIEF DESCRIPTION OF THE DRAWINGS

FIG. 4 is a flow chart of the Rule Tool text subroutine;

FIG. 5 is a flow chart of the procedure for creating a function drum with the Rule Tool;

FIG. 6 is a flow chart of the procedure for modifying an existing function drum with the Rule Tool;

FIG. 10 is a flow chart of the procedure for creating an icon drum;

FIG. 12 is a flow chart of the procedure for modifying an existing icon drum;

DETAILED DESCRIPTION OF A PREFERRED EMBODIMENT

Figure 1:
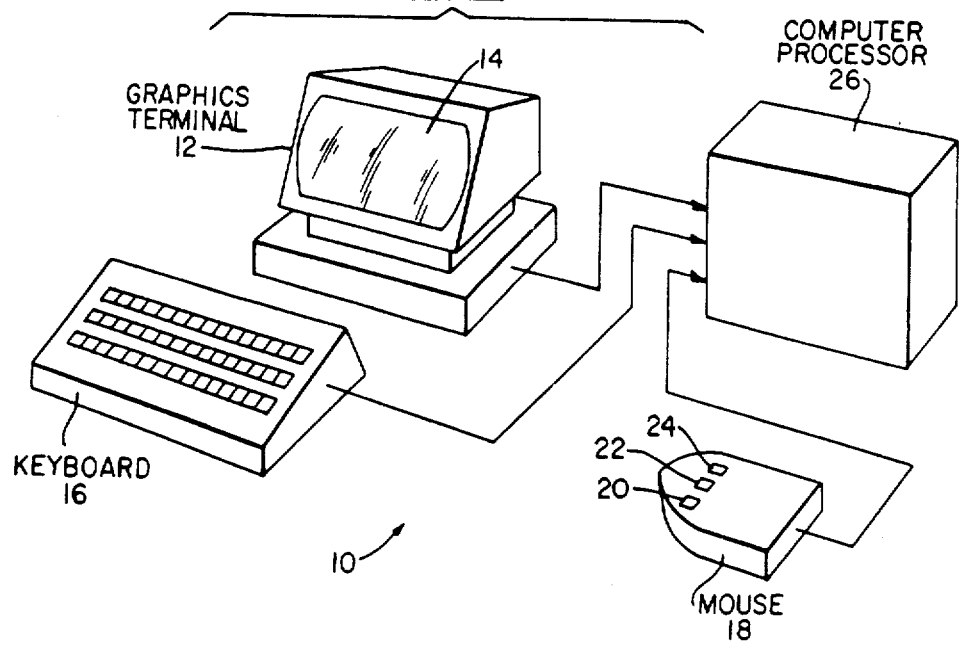
FIG. 1 is a perspective view of the components of the system of the present invention.

Turning now to FIG. 1, the system 10 of the present invention comprises a graphics terminal 12 with a display screen 14. Graphics terminal 12 is coupled to a computer processor 26, which also supports keyboard 16 and mouse 18. The graphics terminal, display screen and computer processor can be a personal computer ("PC") of a type well known in the art, such as the PC manufactured by Wang Laboratories of Lowell, Massachusetts. Mouse 18 includes three switches 20, 22, and 24 which are assigned, for right-handed use respectively, the actions of select, cancel and evaluate. For left handed use, the position of the select and evaluate buttons can be reversed, to provide for corresponding finger use to depress a button.

The select button 20 indicates to the system, when pressed, the selection of a free space point, object, icon, or function based on the position of a cursor 29 controlled by mouse 18 on screen 14. To select a free space point, the cursor is positioned to the desired location on screen 14 and the select button 20 is actuated. A free space point is any point not occupied by, or within the tolerence of, an object. A marker is displayed at the selected point. An object is selected by positioning the cursor on or near (with a search tolerance) the object on screen 14 and actuating select button 20. An icon is selected by placing the cursor within a defined boundary box for the icon. A function is selected by simply moving mouse 18 so that the cursor on screen 14 is within a box enclosing the function, and then actuating select button 20.

Function selection can also be associated with evaluate button 24. To perform the association, mouse 18 is moved so that cursor 29 is within the desired function box, and then evaluate button 24 is actuated. The function selected will become associated with evaluate button 24 and, from that point on, actuating the evaluate button will produce the same result as positioning the cursor over the function and actuating the select button. The advantage of the association of a function with evaluate button 24 is the minimization of eye & hand movement.

Cancel button 22, when actuated, causes the system to disregard the last action. This is useful in overcoming an unintentional actuation of one of buttons 20 or 24, or to recover when a problem solving user or methodology designer has changed his or her mind with respect to the next action to be taken.

Keyboard 16 is provided in order to enable the input of numbers and text into the system. The design and use of keyboards and mouse devices and their interface with computer systems, including graphics terminals, executive work stations, computer aided design systems and the like is well known, and those skilled in the art are aware of how to implement such input devices. Any of the known systems for interfacing mouse 18 and keyboard 16 with computer processor 26 and graphics terminal 12 can be used in connection with the present invention. It is noted that alterntive input means, for instance a graphics tablet, can be used instead of mouse 18.

Figure 2:
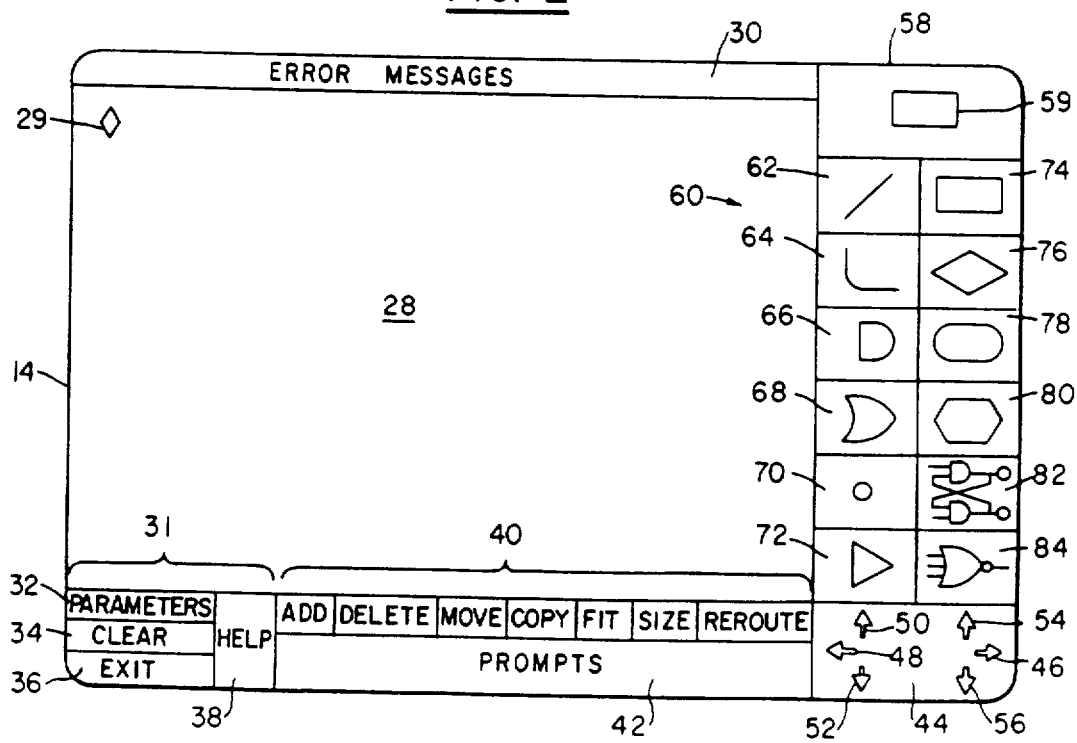
FIG. 2 is an example display which might appear on the graphics terminal.

FIG. 2 shows a sample multi-portion split display which can be output on screen 14 of graphics terminal 12 in accordance with the present invention. The display is "split" into system defined areas called regions. A region is defined to be a rectangular area of the screen enclosed by a border of lines. Each region serves a functional purpose, and is adjacent to another region. None of the regions overlap.

In FIG. 2, region 28 is the chart work area, and is a view of the drawing or a portion thereof that is presently being worked on by a problem solving user or methodology designer. Chart work area 28 may be thought of as a window through which one is viewing a chart that sits beneath. It is within this region that schematic diagrams are created and edited by a problem solving user, and new icons and functions are created by a methodology designer.

The entire available area onto which a chart may be created is called the drawing space. At any one time, the drawing region in chart work area 28 is a display of a part, or all, of that drawing space. Since only a portion may be visible, means is provided to view the other areas of the drawing space. Such means is provided by navigation region 58.

Navigation region 58 contains a rectangle 59 called the view port The view port represents that portion of the chart currently visible in chart work area 28. For example, if view port 59 is half the size of the navigation region 58, and directly in the center, then exactly half of the drawing space is visible in chart work area 28. Since view port 59 is centered, the half that is visible in chart work area 28 is the center of the drawing space.

To view a different portion of the drawing space, a function which is built into the system, called the move function, is used to move the view port 59 to the desired location within navigation region 58. In order to scale the size of the drawing space, the size of view port 59 must be altered. This is done by using a size function built into the system. Once the move and/or size functions are completed, the drawing region is refreshed to display the correct portion of the chart at the correct scale.

Another region on display screen 14 is known as the icon drum region 60, which displays a portion of what can be thought of as a band of icons upon a drum. Icons represent various symbols, lines, and text that can be selected for placement in the drawing region of chart work area 28. The band of icons that is placed upon the drum in icon drum region 60 depends upon the level in which one is working on the system and the type of schematic diagram that is to be created or edited by a problem solving user, or the new function or icon to be created by a methodology designer. There are actually two drums within region 60, each having their own band of icons and which may be individually manipulated. One band contains icons 62, 64, 66, 68, 70 and 72 (and others not visible). The other band contains icons 74, 76, 78, 80, 82, and 84 (and others not visible). If a desired icon is not displayed in region 60 when needed, the drums can be scrolled until the desired icon appears.

Underneath each icon drum are two pair of arrows 50, 52 and 54, 56. These are scroll control arrows and represent the function of spinning the drum above the arrows selected. If, for example, arrow 50 is selected, the drum containing icons 62-72 will be spun upward. Selecting arrow 52 would spin this icon drum downward. Similarly, selecting either of arrows 54 or 56 would spin the icon drum comprising icons 74-84 upward or downward, respectively. The scroll control arrows are contained in region 44 of display screen 14. Also contained in region 44 are scroll arrows 46 and 48 which are used to horizontally scroll the function drum 40 as described below.

Region 40 in display screen 14 is the function drum region and contains the functions of the system that are applicable to icons or schematic diagrams or their parts. As shown in FIG. 2, the functions in region 40 are in the form of text strings. As will be described hereinbelow, however, region 40 can also contain symbols which represent functions or function primitives. If a desired system function is not displayed in region 40 when needed, right and left scrolling arrows 46 and 48 can be used to spin the function drum toward the right or toward the left until the desired function appears.

Region 42 on display screen 14 is a prompt region which serves two purposes. First, the system uses region 42 to display prompts, which are usually in the form of text strings, to the problem solving user or methodology designer. Second, any textual data entered by a problem solving user or methodology designer through keyboard 16 is echoed in prompt region 42.

An informational region 31 on display screen 14 provides a problem solving user or methodology designer with four selectable functions presented by text strings. These functions are labeled "parameters", "clear", "exit", and "help". The selection of the parameters function 32 brings up all of the parameters which can be set by a problem solving user or a methodology designer within the system. Examples of such parameters are text height, left or right handedness, line spacing, a parameter known as drum roll which defines how many icons are scrolled when the scroll arrows are used, and the scaling factor for defining the percentage any object is scaled when the size function is applied.

The clear function 34 in informational region 31 is equivalent to multiple cancels If the problem solving user's or methodology designer's intent is to back up to the point of the previously committed function, the cancel function could be selected as many times as needed, or the clear function could be invoked once.

Help function 38 in informational region 31 displays information about objects or functions selected by a problem solving user or methodology designer. The information appears in a page which overlaps the drawing region in chart work area 28. Those skilled in the art will recognize that various types of information can be provided to a problem solving user or methodology designer by accessing the help function.

Exit function 36 in informational region 31 enables a problem solving user or methodology designer to exit from his current work with the system, saves the work and the status of the session and returns the display back to an alphanumeric menu for selecting the next activity to be accomplished with the system.

Another region of display screen 14 is error region 30. This region is used by the system to display error messages. The message displayed describes an invalid action taken by the problem solving user or methodology designer. The message will remain visible until the next action is taken, i.e., either one of buttons 20, 22, or 24 is actuated on mouse 18, or a keystroke is made on keyboard 16.

Before discussing the heart of the present invention, which is the provision of means for enabling a methodology designer to create new icons and functions with a set of rules pertaining to each new icon and function, it is necessary to explain how the basic system can be used to sketch, in graphic form, on chart work area 28 of display screen 14. This basic level of system operation is referred to as the "sketch" mode.

The sketch mode provides a free form diagramming capability with no restrictions imposed by the system. A variety of creation and editing functions exist. The problem solving user interfaces with the system to create sketches through mouse 18. The relative movement of mouse 18 causes a corresponding movement of a cursor 29 on chart work area 28 of display screen 14. A problem solving user may continually move the cursor near an icon on the icon drum 60 or a function on the function drum 40 and actuate select button 20. This will associate mouse 18 with the object (icon or function) selected. If, for example, cursor 29 is moved into the region of icon 74, and select button 20 is actuated, a rectangle (the object of icon 74) will become associated with mouse 18. Mouse 18 can then be moved to drag the rectangle across chart work area 28 until a desired location is reached. Upon activation of the select button, a rectangle will be deposited at the desired location in chart work area 28. When a function is to be used, mouse 18 is moved to place cursor 29 over the desired function in function drum 40, and the select or evaluate button is actuated to associate the function with mouse 18. By manipulating functions and icons with mouse 18, and placing icons on chart work area 28 at desired locations and with desired connections, schematic diagrams can be drawn. Interaction with other regions of display screen 14 is achieved through the use of mouse 18 in a similar manner. It is noted that in the system of the preferred embodiment, data may be selected in the postfix sequence, i.e. where the function selection occurs after data selection, in the prefix mode, where function selection preceeds data selection, or in the infix mode, where function and data selection occur alternately.

Various classes of icons may appear in the icon drum 60. The majority of icons are representations of symbols, which have meaning with respect to a particular type of chart the problem solving user is building. The creation of this type of icon by a methodology designer in accordance with the present invention is discussed later on. It is noted that geometry represented by an icon may or may not be identical to the geometry actually shown in the icon drum. Thus, where the actual symbol is too complex to fit within the icon drum display portion of display screen 14, a more simplified symbol (pseudonym for the actual symbol) will be shown. However, when the icon is placed in a chart, the symbol's actual geometry will appear. Such symbols may contain geometry consisting of lines, arcs, circles, other symbols and other geometric or graphical primitives or their components, as well as text fields.

In its simplest mode of operation, the present system can be used to create a "throw-away", electronic paper form of a diagram which a problem solving user can use for discussion or initial concept purposes. This mode of operation is referred to herein as the "chart mode". Once a problem solving user decides on a solution strategy, a schematic diagram mode can be entered which will enable a problem solving user to generate an actual problem solution in terms of a formal schematic diagram.

The icon drum initially supplied with the system will contain icons for use during the chart mode and during the schematic diagram mode of operation. The icons supplied for the chart mode are those for each type of line, arc, polyline and other graphical primitives as may be supplied. These icons may be depicted by solid, dashed and potentially other line styles.

Lines are scalar objects with no direction. They have no pre-defined association with other graphic primitives, icons, diagrams, or their parts. Lines may be attached by placing the end point of the line within the tolerence of the geometry of any graphic primitive, icon, diagram, or part of a diagram.

A polyline is a multisegmented line. Polylines are considered to be one object for the purposes of the system's functions applicable to icons and diagrams or their parts.

An arc is defined by three points; namely, the first end point, a point along the arc, and the other end point, in that order.

Additional primitive graphic icons are provided for use when building schematic diagrams. These include connectors, polyectors (poly-connectors), and conarcs.

Connectors are a special class of line or arc that always attach to a symbol at a connection point. Connectors may have text fields associated with them much like symbols do. They may have direction or they may be scalar. A connector is a single line or a single arc of any style (e.g. dashed, dotted, solid line, etc.). If it is desired to attach a connector to a symbol, the connector element must attach to a connection point on the symbol, even though the selected point was only near the actual connect point. That is, there are predefined points on a symbol which may be connected to by a connector element. Thus, connectors are distinct from free form lines which may attach to a symbol's geometry for stylistic effects of annotation, but which have no logical connection denoting a communication path between two other elements.

A polyector is a multi-segmented connector to allow the routing of a connection from one object to another where a single straight connector path would interfere with other geometry. A polyector is considered to be one object for the purposes of the system's functions applicable to icons and diagrams and their parts. A polyector is also considered to be one object in establishing logical connectivity between symbols.

A conarc is a connector arc. It is defined in the same way as a regular arc, but it connects to either the ends of connectors, polyectors, or connection points on symbols. Conarcs may also have text fields associated with them and they may have a direction.

The icon drum in the most basic form of the system of the present invention contains three text icons. One such icon is for left justified text, one for center justified text, and one for right justified text. Other, less frequently changed parameters for text, such as font style, vertical justification, and height, can be set using the parameter table function. The text icons provide the functions of adding free form text to the chart. Other forms of text, such as a "label", are specific to a symbol or connector. Such other text forms will be discussed below in connection with the formation of ne icons and functions.

Regardless of the type of text or its association or lack thereof, it is always entered in the same fashion. Assuming that all text parameters are correctly defined, an origin point is selected by moving cursor 29 to a desired position on chart work area 28. This is the point used as the basis for the text justification. When the text function is selected, a text cursor appears in the prompt region 42 of display screen 14. Simultaneously, a very narrow rectangle appears in the drawing region at the origin point. As text characters are input from the keyboard, they appear in the prompt region in the machine font. Simultaneously, the rectangle in the drawing region expands horizontally to show the area the text string would cover. Depending on the justification, the rectangle would expand to the right for left justification, to the left for right justification, and equally in both directions for center justification.

Each time a terminator (e.g. carriage return or other multiple control key sequence) is entered from the keyboard, the rectangle disappears, the text font replaces it in the chart, the prompt region is cleared and the text cursor reappears at the left most character position of the prompt region awaiting another string. The rectangle then reappears at the next indicated line on which text is to be placed in the drawing region. If no more text is to be input, either another function is selected or a null line is entered. If more text than can fit in the prompt region is required on one line, the input string will scroll horizontally in the prompt region.

As noted above, the system of the present invention is operable in a chart mode and a schematic diagram mode. The invention is concerned with the schematic diagram mode, and more particularly with the provision of tools for use by a methodology designer to enable the creation of new icons and functions for use in building schematic diagrams. The icons created by the methodology designer using the tools are formal symbols within an adopted schematic diagram methodology (e.g. for the development of computer software), rather than being general purpose graphic tokens such as those used in the chart mode. These formal icons are used for the creation of schematic drawings and enable the system to accomplish interactive design rule checking within the adopted methodology. All of the formal rules and procedures that are attributed to any given step of the methodology, and which can be further attributed to a graphic symbol or token of some form, are associated with the formal icons on the icon drum of the system. In this manner, as a problem solving user selects an icon for use in placing an instance of the represented symbol in the schematic diagram of the solution, the system concurrently, and at a very high interactive rate, continuously checks to insure that the formal design rules associated with the instance of that symbol are being adhered to by the problem solving user. Thus, even though the data content (as furnished by the problem-solving user) associated with the symbol may not be exactly correct, the logical structure of the schematic as a methodological description must be precisely accurate. The schematic diagram created at this level of system use is not a "throw-away" diagram. Rather, such schematic diagrams are problem solutions which may be used, revised, analyzed, or transformed by other, higher level systems. Such opportunities are available as a result of the methodologically accurate, complete, and logically consistent schematics which are generated by the system of the present invention.

The unique and novel features of the present system will now be explained in detail, with reference to FIGS. 3 through 14 of the drawings. FIGS. 3 through 14 inclusive are flow charts which set forth the operation of system software referred to as the "rule tool". The rule tool allows a methodology designer to create new icons and functions. The new icons and functions will then be accessible to a problem solving user for use in schematic diagram creation. The definable icons are symbols and connectors. Before describing how to create such icons, it is necessary to define what the icons are.

Symbols are the basis of the schematic diagramming process. They are the major part of the schematic diagrams, and are usually of the most interest. They can be of varying complexity. At the sketch mode of system operation, they consist of just the graphics for the symbol and the icon that represents the symbol on the icon drum. No rules of use for the symbol are associated therewith at the sketch level.

At the schematic drawing mode, a given symbol comprises not only graphics but also a specified number of connection points. A connection point defines where a connector may attach and the nature of that attachment. The direction of connection is specified as being input, output, or both (bidirectional). Each connection point also defines what other symbol(s) it may be connected with. A class of symbols or named diagrams may be specified for valid connections.

Symbols for the schematic drawing mode may also contain text fields. There are two major categories of text; namely, extractable and non-extractable. Higher level programs can use these categories to know which text fields to extract. Both types of text can be defined in terms of syntax rules for the text fields. Each text field has a position and may include text that always appears in every instance of the symbol and/or text that varies from instance to instance which the problem solving user must enter every time the symbol is placed. The placement of specific text could optionally have its own syntax rules of number of characters, or a list of valid entries. Such a text field could, for example, be a volume label which always has the form: "vol=[some character string]. The text field would define "vol=" to always appear, and have the problem solving user enter the desired volume value whenever the symbol is placed.

It is also possible to create a symbol which is composed of other symbols, and the same rules will apply. Such compound symbols look the same as a simple symbol, and contain a varying number of connection points with rules on the permissable type of connections. The only difference is that the connection points may be spread over many symbols. An example of the use of a compound symbol would be in diagramming subroutines. The chart for the subroutine could be diagrammed, and then turned into a compound symbol, with the input and output rules defined by the connection point rules of any unconnected points of the subroutine diagram. That subroutine symbol could then be used in other diagrams and the proper checking would be performed.

Connectors are used to connect symbols. They have a graphical description (e.g., linear single segment, linear multi-segment, or curvilinear), and a line style of either solid, dashed, or other form. They can have an icon representation for the icon drum. They can also have extractable and non-extractable text fields as described above for symbols.

Figure 3:
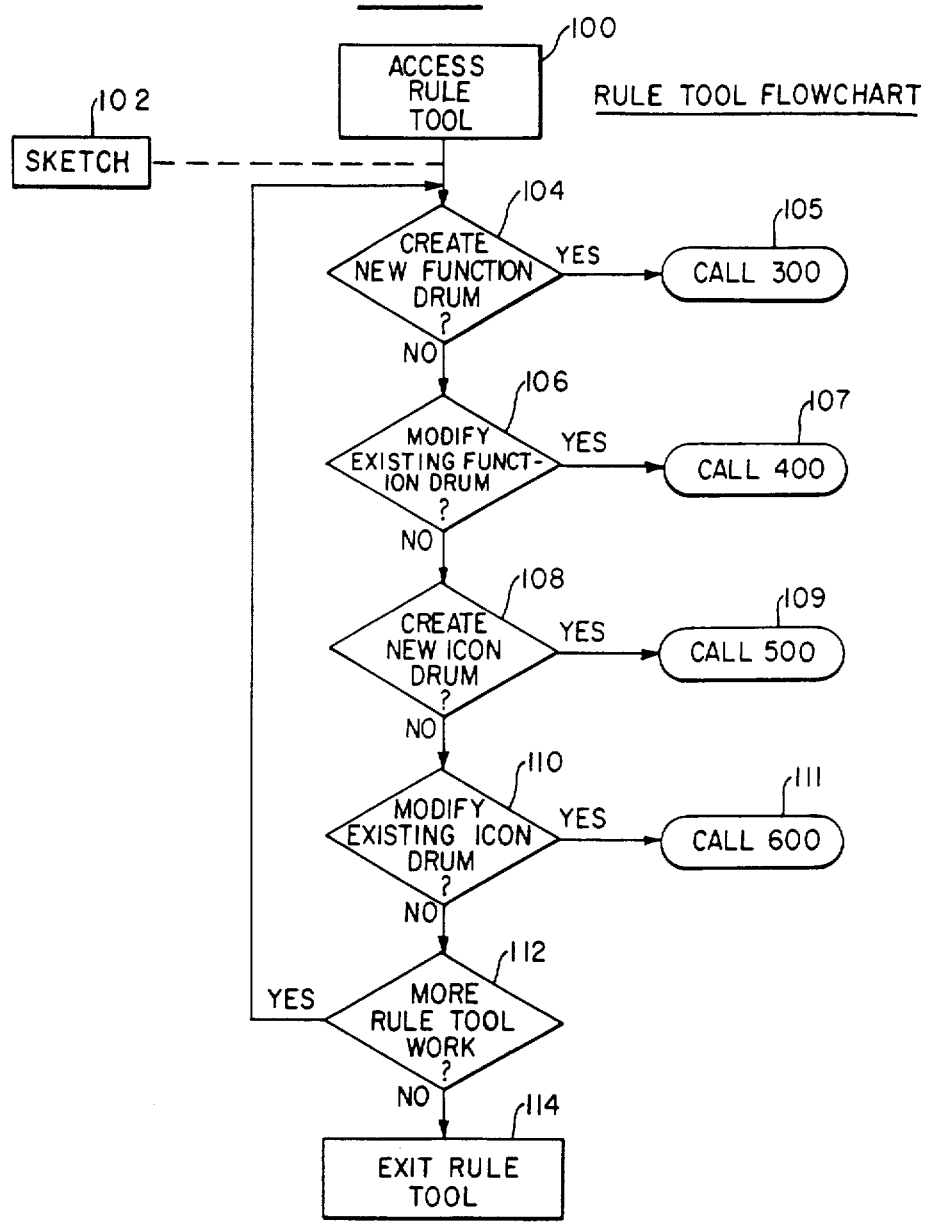
FIG. 3 is a flow chart showing the operation of the "Rule Tool" which enables a methodology designer to create and modify function and icon drums containing functions and icons having rules associated therewith.
Figure 7:
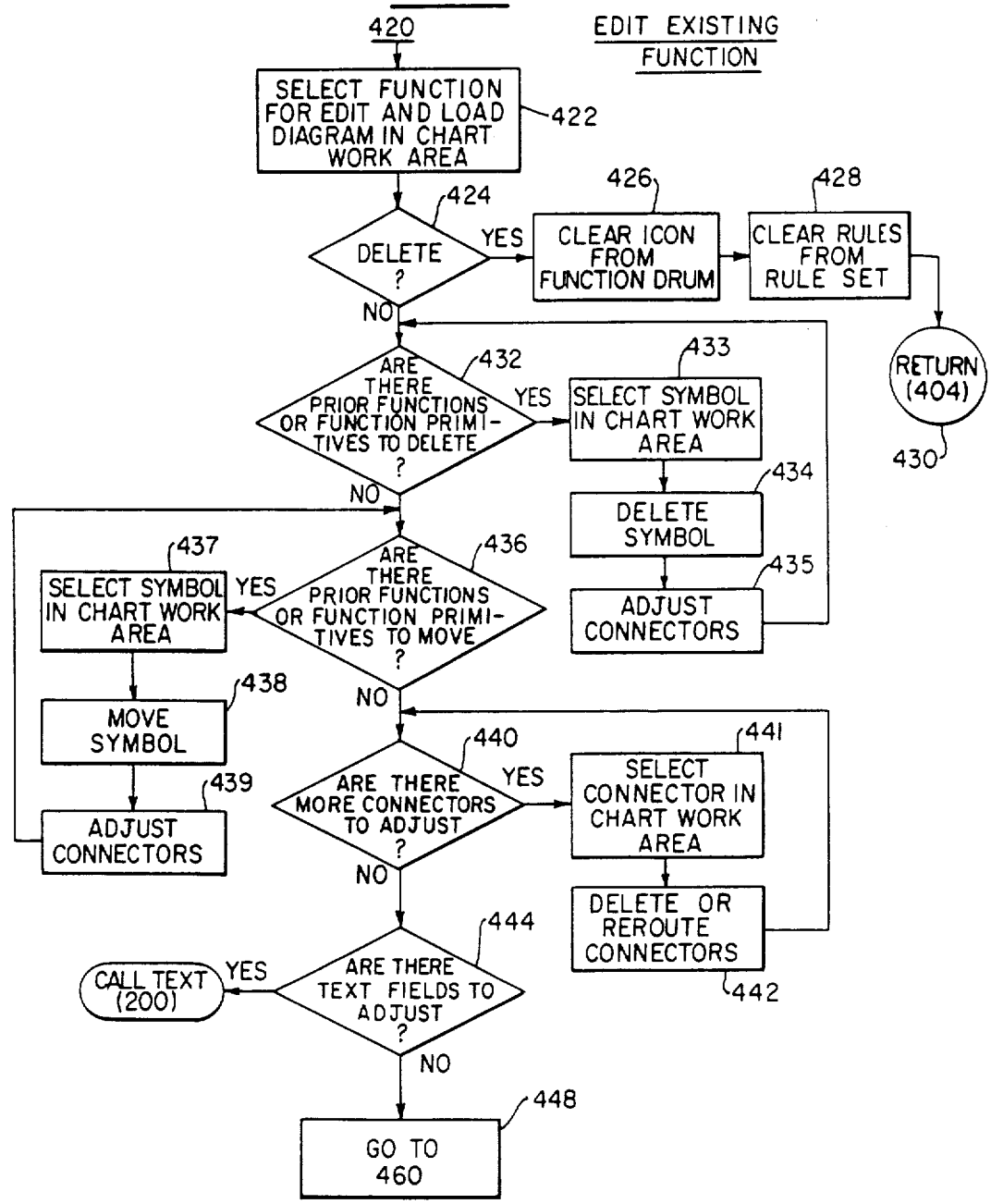
FIG. 7 is a flow chart of the procedure for editing existing functions with the Rule Tool.

Turning now to FIG. 3, box 100 provides for a methodology designer's access to the rule tool. As indicated by box 102, which is connected to the flow chart of FIG. 3 by a dashed line, the sketch program described above is used in combination with the rule tool to enable a methodology designer to create new formal icons and functions. Unlike the system operation by a problem solving user (e.g. during sketch) the use of the rule tool by a methodology designer results in the creation of icons and functions which each have a specific set of rules pertaining to the use thereof.

Once a methodology designer has accessed the rule tool, several prompts are displayed in the prompt region 42 of display screen 14 to determine what activity the methodology designer desires to undertake. At box 104, the system determines if it is the intent of the methodology designer to create a new function drum. If this is the intent, then the routine entitled "create function drum" (set forth in FIG. 5) is called at box 105. Otherwise, the rule tool proceeds to box 106 which inquires whether the methodology designer wishes to modify an existing function drum. If so, the routine entitled "modify existing function drum" (set forth in FIG. 6) is called at box 107. Otherwise, the methodology designer is asked at box 108 whether a new icon drum is to be created. If a new icon drum is to be created, the routine entitled "create icon drum" (set forth in FIG. 10) is called at box 109. Otherwise, the methodology designer is prompted at box 110 to determine if modifications are to be made to an existing icon drum. If this is the case, the routine entitled "modify existing icon drum" (set forth in FIG. 12) will be called at box 111. Otherwise, control will pass to box 112 which asks the methodology designer if more rule tool work is to be done. If so, control passes back up to box 104 and the process repeats. Otherwise, the methodology designer exits the rule tool at box 114.

When the rule tool calls another routine, such as indicated by boxes 105, 107, 109 and 111 of FIG. 1, control immediately passes to the routine called, and returns back to the box prior to the "call" box shown in the flow chart when a corresponding "return" command is reached in the called routine. Thus, for example, if a methodology designer intends to create a new function drum, as determined at box 104 in FIG. 3, the "create function drum" routine will be called by box 105. Once a return from the "create function drum" routine is reached (box 322 shown in FIG. 5), the program flow will be returned to box 104 of FIG. 3.

In the flow charts provided in FIGS. 3 through 14, "return" boxes are annotated with the numbers of the boxes from which the routine could have been called, and to which control should be return, as appropriate, once the routine has been executed. Those skilled in the art will appreciate that several returns may be nested, and control will be passed from a return box back to the box which called the routine in the proper nested order.

If a methodology designer indicates at box 104 that a new function drum is to created, the "create function drum" routine (designated by numeral 300 and shown in FIG. 5) will be accessed. As shown in FIG. 5, this routine requires the methodology designer, at box 302, to label the new function drum with the name of the category of operations to which the new function drum will pertain. At box 304, the methodology designer is required to enter the name of a chart type which can be used with this function drum. Such chart type might be, for example, flow charts for computer software design, flow charts for chemical processes, electrical circuit schematics, and the like. After entering the name of one chart type, the methodology designer is required at box 306 to indicate if there is another chart type which can be used with this function drum. If so, control is returned to box 304, and the process repeats until all of the chart types which can be used with the function drum have been identified.

When there are no more chart types to be identified, control passes to box 308 where the rule tool generates a chart type menu for the function drum being created. The chart type menu lists all of the different chart types which can be used with the function drum. The menu is stored so that it can be displayed at a future time to a problem solving user who selects this particular function drum for use in building a schematic diagram. At such time, the chart type menu will be displayed to the problem solving user so that the desired chart type can be selected.

At box 310, the rule tool associates the chart type menu with the name of the category of operations that the function drum was labeled with in box 302. In box 312, the name of the category of operations is added to the system operations menu. The system operations menu is displayed to a problem solving user at the beginning of the schematic diagram mode of system operation. The problem solving user selects a category of operations, thereby defining the applicable function drum. The chart type menu associated with function drum is then displayed and the problem solving user selectes a chart type as described above.

At box 314 of the "create function drum" routine, the methodology designer is prompted to indicate if the function drum being created is complete. If the answer is no (which will be the case the first time the methodology designer is asked the question), a routine entitled "add new function" will be called as indicated at box 316. The "add new function" routine is shown in FIG. 8.

New functions can be created in three different ways. A brand new function can be created by concatenating function primitives stored in the system. Examples of function primitives are the "AND", "OR", and "NOT" logic operators. Alternatively, a new composite function can be created by concatenating function primitives with other existing complex functions. "Macrofunctions" can be created by concatenating a plurality of existing complex functions.

In addition to the above, there is another type of function which a methodology designer can build using the present system. These functions are, in effect, value tables for an icon or icon/function combination which has been built. Such a value table is created by identifying all connectors which exit from a given symbol, and assigning values (pointer values, derived valves, or literal values) to all non-terminated inputs and outputs. Straightforward, known techniques (e.g. calculus of variation) are used to establish a transfer function for the symbol in accordance with the assigned input and output values.

Figure 8:
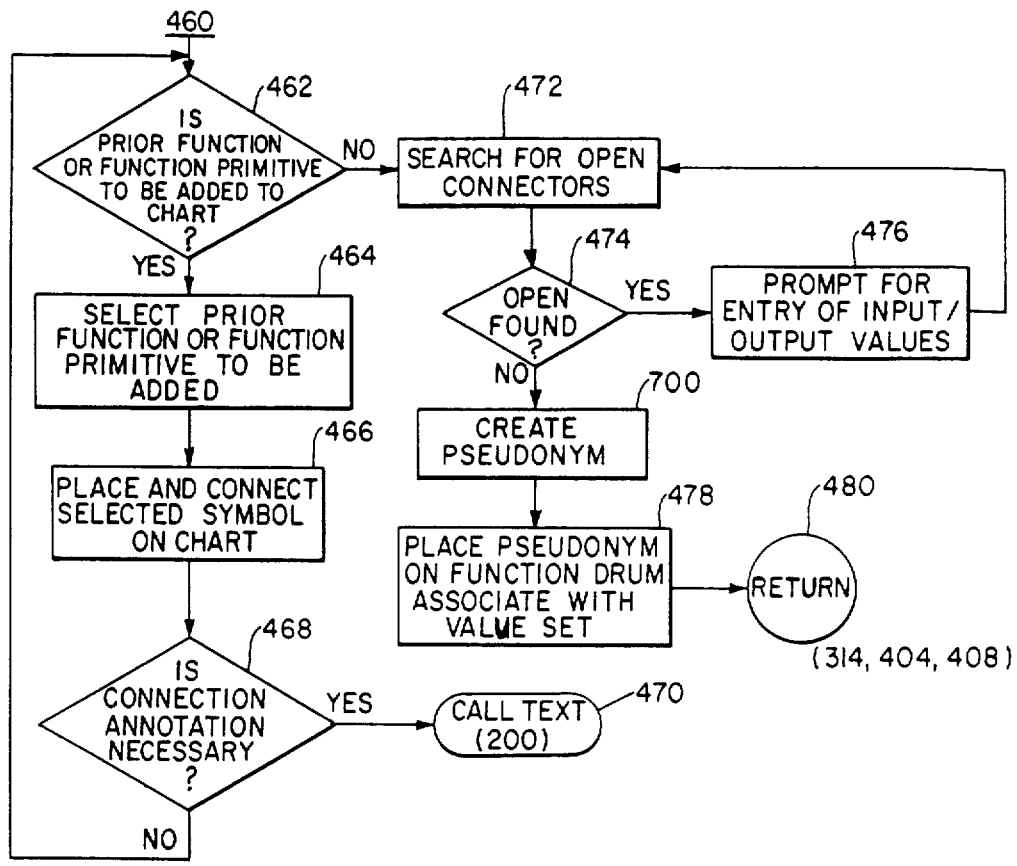
FIG. 8 is a flow chart of the procedure for adding a new function with the Rule Tool.

When the "add new function" routine shown in FIG. 8 is entered at 460, box 462 requires the methodology designer to indicate whether a prior function or function primitive is to be added to the chart. If so, control passes to box 464 which requires the methodology designer to select the prior function or function primitive to be added to the chart. The selection of the prior function or function primitive will be made by using mouse 18 to select the appropriate symbol from the function drum 40 displayed on display screen 14. The use of mouse 18 to select symbols from the function and icon drums has already been explained hereinabove.

Once the desired symbol has been selected, the methodology designer is required at box 466 to place it on the chart work area and connect it to other symbols on the chart as appropriate. Control then passes to box 468 which asks the methodology designer whether any connector annotation is necessary. If no such annotation is necessary, control reverts to box 462 and the procedure repeats until all necessary symbols have been selected, placed, and connected on the chart. In the event connector annotation is necessary, box 468 passes control to box 470 which calls a routine entitled "text".

The "text" subroutine is shown in FIG. 4. After entering the text subroutine at 200, the system asks the methodology designer at box 202 if there is text already present in the chart being worked on. If not, the methodology designer is required at box 205 to designate the text start point, and at box 207 to select the text justification. Otherwise, control passes from box 202 to box 204 which requires the methodology designer to find the start point of the existing text.

The rule tool next steps the methodology designer, one character position at a time, through the new text to be added (box 208 . Creation or alteration of text commences at the designated start point and the procedure is the same whether the methodology designer is creating a new text field or modifying an existing string of text. At box 208, the methodology designer is required to decide whether the next character position is to be retained as is or altered. If it is to be retained, control passes to box 212 which merely spaces to the next character, and redirects control to box 208. If the character is to be altered, control passes to box 214 where the methodology designer is required to indicate if the new character is to be fixed text or variable text. If fixed text is desired, control passes to box 216 which requires the methodology designer to enter the desired fixed character. Control then passes back to box 208. If variable text is desired, control passes to box 218 which requires the methodology designer to enter the variable text designator which indicates to the system that a problem solving user will ultimately have to enter text at this character position. Control is then passed back to box 208 and the process continues until the methodology designer indicates that there is no next character position (i.e., the end of the text line has been reached). At this point, control will pass to box 220 where a line termination designator is entered. At box 222 the methodology designer will be prompted to indicate if another line of text is desired. If so, a line advance is generated at box 224 and control is passed back to box 208 so that the new line can be created. When all of the lines of text have been created, control will be passed from box 222 to box 226 which returns control back to the point from which the text subroutine was entered. In the present example, the text subroutine was called by box 470 of the "add new function" routine shown in FIG. 8. Thus, control will be passed back to box 468 shown in FIG. 8, which is the box that precedes the call text box 470.

Turning back to FIG. 8, once all prior functions and function primitives necessary to create a new function have been selected, placed on the chart work area, and connected to the chart, and all connector annotation has been accomplished, control will be passed from box 462 to box 472. At this point, the system analyzes the symbol currently on the chart work area to locate open ended connectors. When an open ended connector is found, box 474 passes control to box 476, which prompts the methodology designer to enter the appropriate input or output value for the open ended connector.

Figure 9:
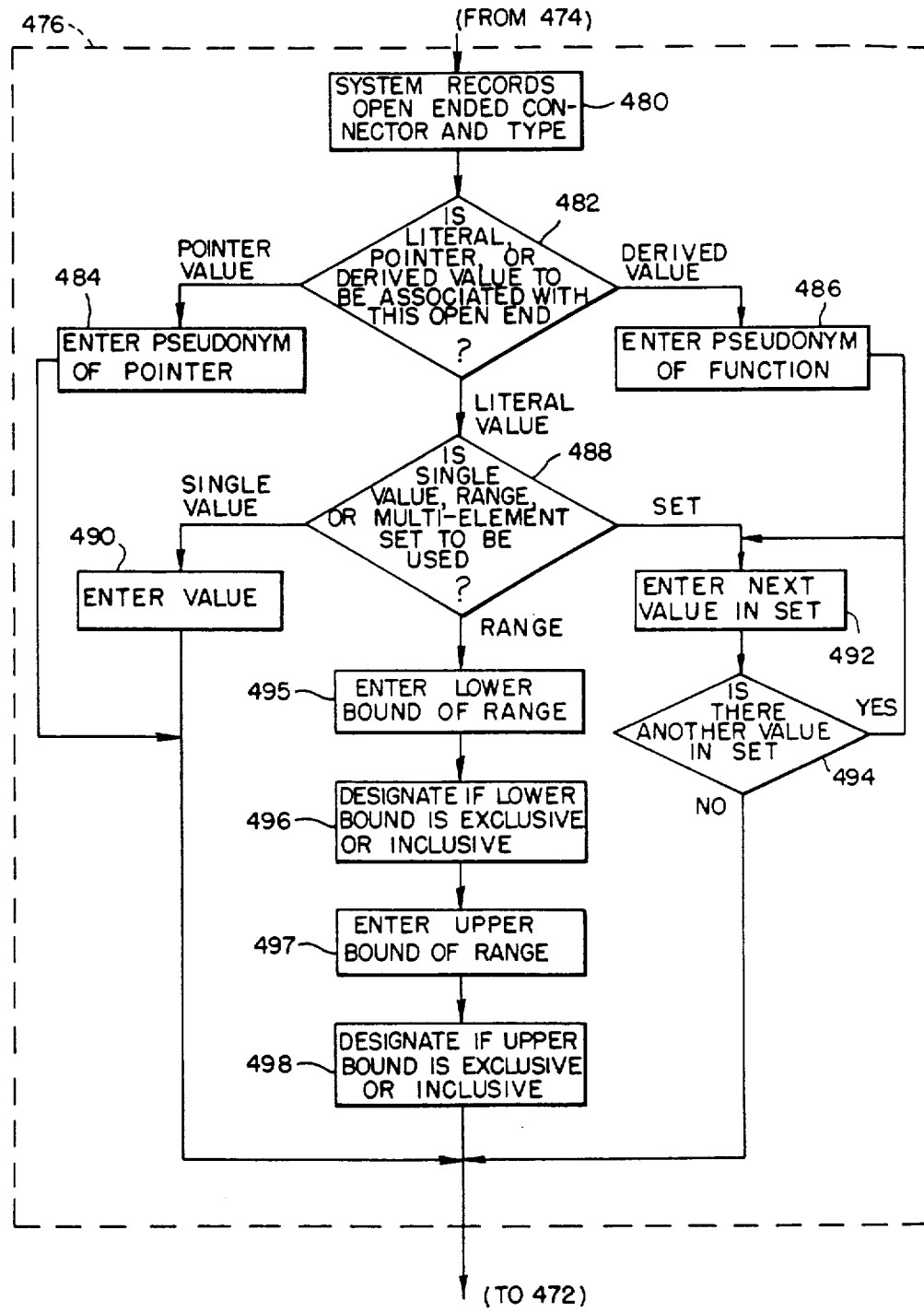
FIG. 9 is a flow chart of the procedure for prompting open ended connectors.

Box 476 is shown in greater detail in FIG. 9, entitled "prompting of open ended connectors". As shown in FIG. 9, when an open connector is found the system records the connector and its type as indicated at box 480. Then, control is passed to box 482 where the methodology designer is prompted to indicate if a literal, pointer, or derived value is to be associated with the open end of the connector. If a pointer value is designated, control passes to box 484 and the methodology designer is required to enter the pseudonym of the pointer. A pointer value is not a numerical value itself, but rather an address or "pointer" to a location which contains the value to be associated with the open ended connector. Once the pseudonym of the pointer has been designated, control passes from box 484 out of box 476 and on to box 472 of FIG. 8.

If, at box 482 of FIG. 9, the methodology designer indicates that a derived value is to be associated with the open ended connector, control is passed to box 486 which requires the entry of the pseudonym of the function from which the value is to be derived. From box 486, control exits box 476 and continues on to box 472 of FIG. 8.

If the methodology designer indicates at box 482 of FIG. 9 that a literal value is to be associated with the open end of the connector, control passes to box 488 where the methodology designer indicates whether a single value, range, or multi-element set of values is to be used. If a single value is indicated, control passes to box 490 where the methodology designer enters the value. Control is then passed out from box 476 and on to box 472 of FIG. 8.

If a range of values is to be associated with the open ended connector, control passes from box 488 of FIG. 9 to box 495 where the methodology designer enters the lower bound of the range. Then, at box 496, the methodology designer is prompted to designate if the lower bound indicated at box 495 is exclusive or inclusive. Control then passes to box 497 where the upper bound of the range is entered. Then, at box 498, the upper bound is designated as being exclusive or inclusive. Once the range has been entered, control passes from box 498, out from box 476, and on to box 472 of FIG. 8.

If, at box 488 of FIG. 9, the methodology designer indicates that a set of values is to be associated with the open ended connector, control passes to box 492 and the next value in the set is entered. At box 494 the system prompts the methodology designer to indicate if there is another value in the set. If so, control is passed back to box 492 and the process continues until all values in the set have been entered. Once the set is complete, control passes from box 494, out from box 476, and on to box 472 of FIG. 8.

After control is passed back to box 472 from box 476, the search for open ended connectors continues until values have been assigned to all of the open ended connectors. Then, control is passed to box 700 for the creation of a pseudonym for the new function. The pseudonym is the symbol which will be stored on the function drum for future access of the new function created. Although the pseudonym can be the entire symbol built by the methodology designer through the use of the "add new function" routine, such will only be possible if the symbol is simple and will fit on the function drum. Otherwise, an abbreviated form (i.e., pseudonym) will have to be created to identify the new function on the function drum. The creation of pseudonyms at box 700 is set forth more completely in FIG. 14, which shows box 700 in greater detail.

Figure 14:
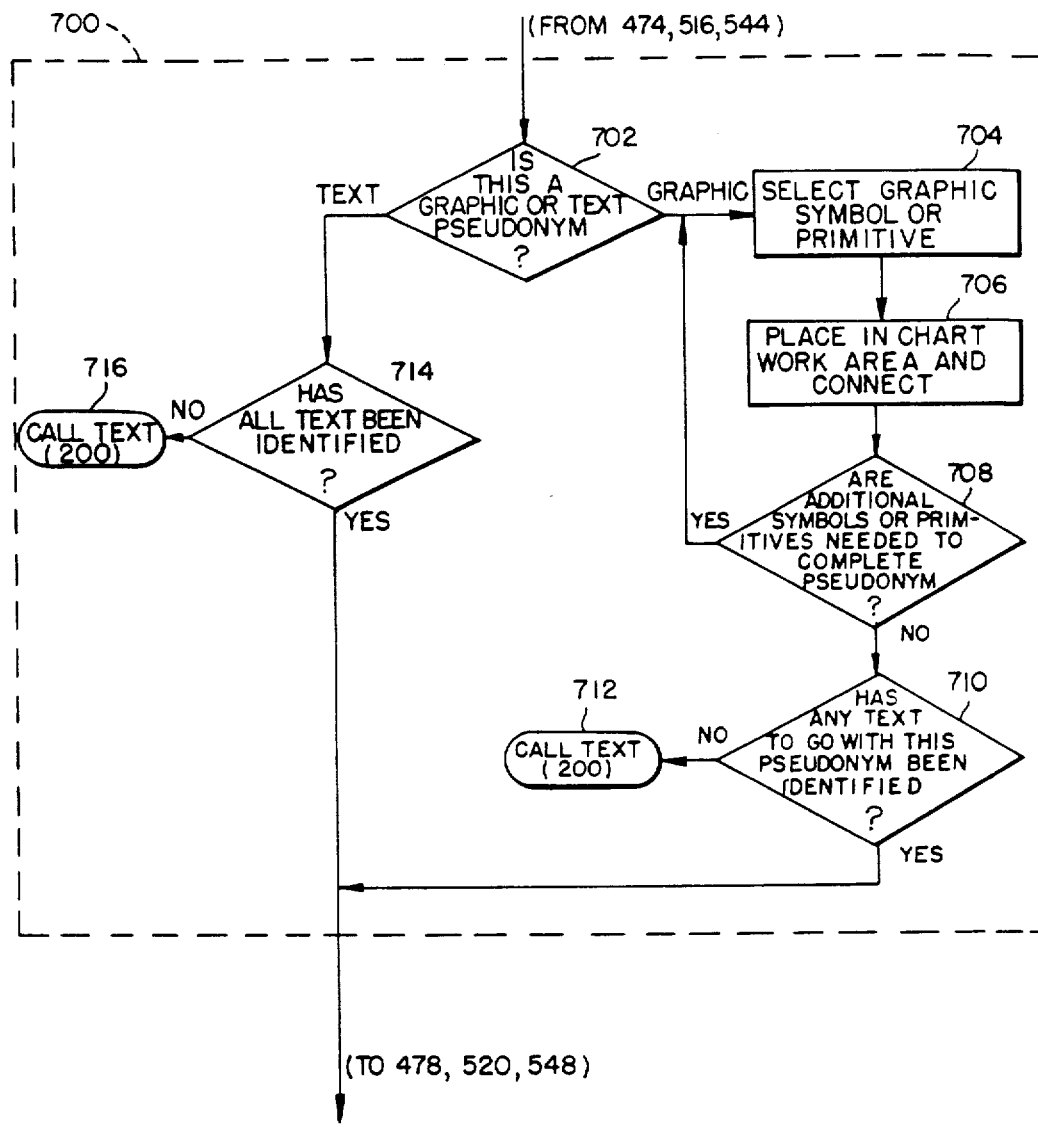
FIG. 14 is a flow chart of the procedure for creating pseudonyms for functions or icons.

As shown in FIG. 14, box 702 prompts the methodology designer to determine if a graphic or text pseudonym is being created. If a graphic pseudonym is desired, control passes to box 704 where the methodology designer is required to select the graphic symbol or primitive from which the new pseudonym is to be built. Box 706 requires the methodology designer to place the selected symbol or pseudonym in the chart work area and to connect it to any other symbols or primitives already in the chart work area. At box 708, the methodology designer is required to specify if there are additional symbols or primitives needed to complete the pseudonym. If so, control returns to box 704 and the process continues until the symbol for the pseudonym is complete. Then, control is passed to box 710 where the methodology designer is required to indicate if any text which goes with the pseudonym symbol has been identified. If not, the text subroutine (numeral 200, FIG. 4) is called at box 712. After all text has been identified, control passes from box 710 out from box 700 and onto the next successive box.

If, at box 702, the methodology designer indicated that a text pseudonym was to be created, control passes to box 714 which determines if all text has been identified. If not, the text subroutine is called at box 716. Once all text has been identified, control is passed from box 714 to the next box in the flow chart.

In the present example, the next succeeding box is box 478 in FIG. 8. At this point, the pseudonym is placed on the function drum and associated with the value set applicable to the function. At box 480, control is returned to the portion of the rule tool from which the "add new function" routine was originally called. In the present example, control is returned to box 314 in FIG. 5.

Once the function drum being created by the methodology designer is complete, control is passed from box 314 to box 318 and a map of the function drum is stored in the system as a graphics file. At box 320, the set of rules to be associated with each function in the function drum is linked to the function drum for later recall any time the function drum is selected by a problem solving user. At box 322, the rule tool returns to the point from which the "create function drum" routine was called which, in the present example, was box 104 of FIG. 3.

If the methodology designer desires to modify an existing function drum, box 106 of FIG. 3 will pass control to box 107 which calls the "modify existing function drum" routine shown in FIG. 6. From entry point 400, this routine proceeds to box 402 and requires the methodology designer to furnish the name of the function drum to be modified. Box 404 then prompts the methodology designer to determine if an existing function on that drum is to be edited. If so, box 406 calls the "edit existing function" routine shown in FIG. 7.

From entry point 420 in the "edit existing function" routine, control proceeds to box 424 which requires the methodology designer to select the function for edit and to load the diagram for that function in the chart work area. The diagram loaded into the chart work area can comprise function primitives, prior functions, or prior icons to be edited. Control then passes to box 422 which prompts the methodology designer to determine if the diagram loaded into the chart work area is to be merely deleted. If so, the diagram is deleted from the function drum at box 426, and the rules associated therewith are cleared from the rule set at box 428. Box 430 then returns to box 404 of FIG. 6 from which the "edit existing function" routine was called.

If the existing function is to be edited and not merely deleted, control is passed to box 432 which requires the methodology designer to indicate if there are specific prior functions or function primitives to be deleted from the diagram representing the function to edited. If so, at box 433 the methodology designer is required to select the symbol of the prior function or function primitive in the chart work area to be deleted. This symbol is deleted at box 434, and the methodology designer is required at box 435 to adjust the remaining connectors in the diagram as necessary. Control is then returned to box 432 where the process can repeat or continue on to box 436. At box 436, the methodology designer is required to indicate if there are prior functions or function primitives to be moved in the diagram currently in the chart work area. If so, the symbol to be moved is selected at box 437, moved at box 438, and necessary connector adjustments are made at box 439. Again, the process repeats until all moves of prior functions or function primitives are completed.

Control next proceeds to box 440 which requires the methodology designer to indicate if any more connectors are to be adjusted. If so, a connector is selected in box 441, deleted or rerouted in box 442, and the process continues until all connectors have been adjusted. Control next passes to box 444 which determines if any text fields are to be adjusted. If so, the text subroutine is called at box 446, the text fields are adjusted, and control is returned to box 444. Once all text fields have been adjusted, the rule tool proceeds to enter the "add new function" routine shown in FIG. 8 and already discussed hereinabove. Upon completion of the add new function routine, box 480 (see FIG. 8) returns control to box 404 of FIG. 6.

When there are no more existing functions to be edited, control is passed from box 404 of the "modify existing drum" routine to box 408 thereof, and the methodology designer is prompted to indicate if a new function is to be added to the function drum. If so, the "add new function" routine shown in FIG. 8 is called at box 410. Once the new function has been added, box 480 of the "add new function" routine returns control to box 408 of FIG. 6.

When no additional new functions are to be added, box 412 prompts the methodology designer to indicate if the function drum being modified is now complete. If not, control is returned to box 404 and the process described above continues. Once the function drum is complete, control is passed to box 414 and the rule tool proceeds to box 318 of the "create function drum" routine shown in FIG. 5. At box 318, the map of the function drum just modified is stored as a graphics file. At box 320, the set of rules to be associated with each function on the modified function drum is linked for later retrieval with each function when the function is selected by a problem solving user operating the system in the schematic diagram mode. At box 322, control is returned back to box 106 in the rule tool flow chart of FIG. 3.

After any modification of existing function drums has been completed, control passes from box 106 to box 108 of the rule tool flow chart, and if a new icon drum is to be created, box 109 calls the "create icon drum" routine shown in FIG. 10. After entering this routine at 500, control is passed to box 502 which requires the methodology designer to label the new icon drum being created with a name. The name will be indicative of the methodology and chart type to which the icon drum relates. At box 504, the methodology designer is prompted to indicate if the icon drum being created is complete. The first time this box is reached, the drum will not be complete and control will be passed to box 505 which calls the "create icon" routine shown in FIG. 11.

Upon entry to the "create icon" routine at 514, control passes to box 515 which prompts the methodology designer to indicate whether the next icon being created has graphics. If not, box 516 inquires as to whether the icon is complete. If the icon is not complete, and it has no graphics, then a text icon is being created and box 518 calls the text subroutine shown in FIG. 4. Upon return from the text subroutine, a pseudonym is created for the completed text icon at box 700. The creation of pseudonyms at box 700, as further detailed in FIG. 14, has already been discussed. The pseudonym for the icon is placed on the icon drum and associated with the rules for that icon at box 520. Control is then returned by box 522 to box 504 of FIG. 10.

Figure 11:
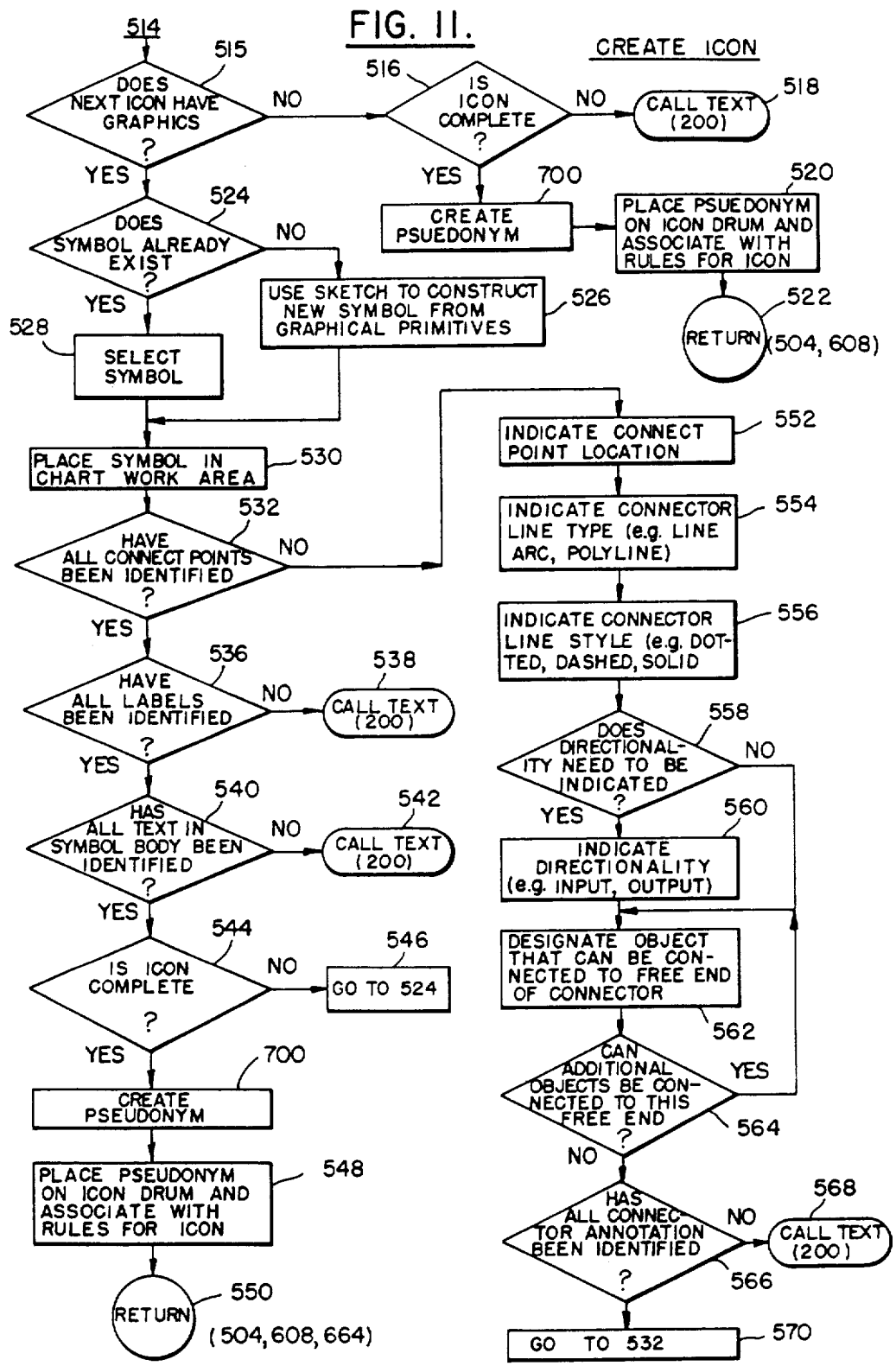
FIG. 11 is a flow chart of the procedure for creating a new icon.

If, at box 515 of FIG. 11, the methodology designer indicates that the next icon to be created has graphics, control will pass to box 524 which determines whether the first symbol to be used in creating the icon already exists. If not, the sketch mode is used to construct a new symbol from graphical primitives already in existence (box 526). Otherwise, the existing symbol is selected at box 528 and placed in the chart work area at box 530. The rule tool then prompts the methodology designer, at box 532, to indicate if all connect points for the symbol have been identified. If not, control passes to box 552 which requires the methodology designer to indicate a connect point location. The connector line type (e.g. line, arc, polyline) and connector line style (e.g. dotted, dashed, solid) are indicated at boxes 554 and 556 respectively. At box 558 the methodology designer states whether directionality has to be indicated. If so, the directionality (e.g. input, output) is indicated at box 560 and control proceeds to box 562 which requires the methodology designer to designate the object that can be connected to the free end of the connector. An object can be a symbol, function, or another schematic diagram. At box 564 the methodology designer states whether additional objects can be connected to the free end of the connector. If so, control returns to box 562 and the process continues until all of the objects that can be connected to the connector free end have been designated. Then control passes to box 566 which determines if all connector annotation has been identified. If not, box 568 calls the text subroutine of FIG. 4. Once all connector annotation has been identified, control returns, via box 570, to box 532 of the "create icon" routine.

Once all of the connect points for the icon being created have been identified, box 532 passes control to box 536 for the identification of icon labels. Labels are searchable text fields associated with an icon. In creating labels, the rule tool sets a flag for each label to indicate that it is a searchable item. If labels are to be identified, box 538 calls the text subroutine. Once all labels have been identified, control passes to box 540 to determine if all text in the icon symbol body has been identified. If not, the text subroutine is called at box 542. Once all symbol body text has been identified, control passes to box 544 where the methodology designer is prompted to indicate whether the icon created is complete. If the icon is not complete, control is returned to box 524 for further building of the icon. Otherwise, a pseudonym is created for the icon at box 700 of FIG. 11, and the pseudonym is placed on the icon drum and associated with the rules for the icon at box 548. Control is then returned via box 550 to box 504 of the "create icon drum" routine shown in FIG. 10.

Turning now to FIG. 10, once the icon drum is complete, box 504 passes control to box 506 where a map of the complete icon drum is stored as a graphics file. At box 508, the set of rules to be associated with each icon in the icon drum is stored and linked to the icons. At box 510, the name of the icon drum just created is added to all of the directories for the function drums that can employ the icon drum. Box 512 then returns control to box 108 of the rule tool flow chart of FIG. 3.

Once any new icon drums have been created by the methodology designer, the rule tool proceeds to box 110 so that existing icon drums can be modified. If such modifications are to be made, box 111 calls the "modify existing icon drum" routine shown in FIG. 12.

After entering the "modify existing icon drum" routine at 600, the methodology designer is prompted at box 602 to furnish the name of the icon drum to be modified. The designated name must, of course, be one for an existing icon drum. Once the icon drum to be modified has been identified, control proceeds to box 604 and the methodology designer is asked whether an existing icon is to be edited. If so, control passes to box 606 and the "edit existing icon" routine shown in FIG. 13 is called.

Figure 13:
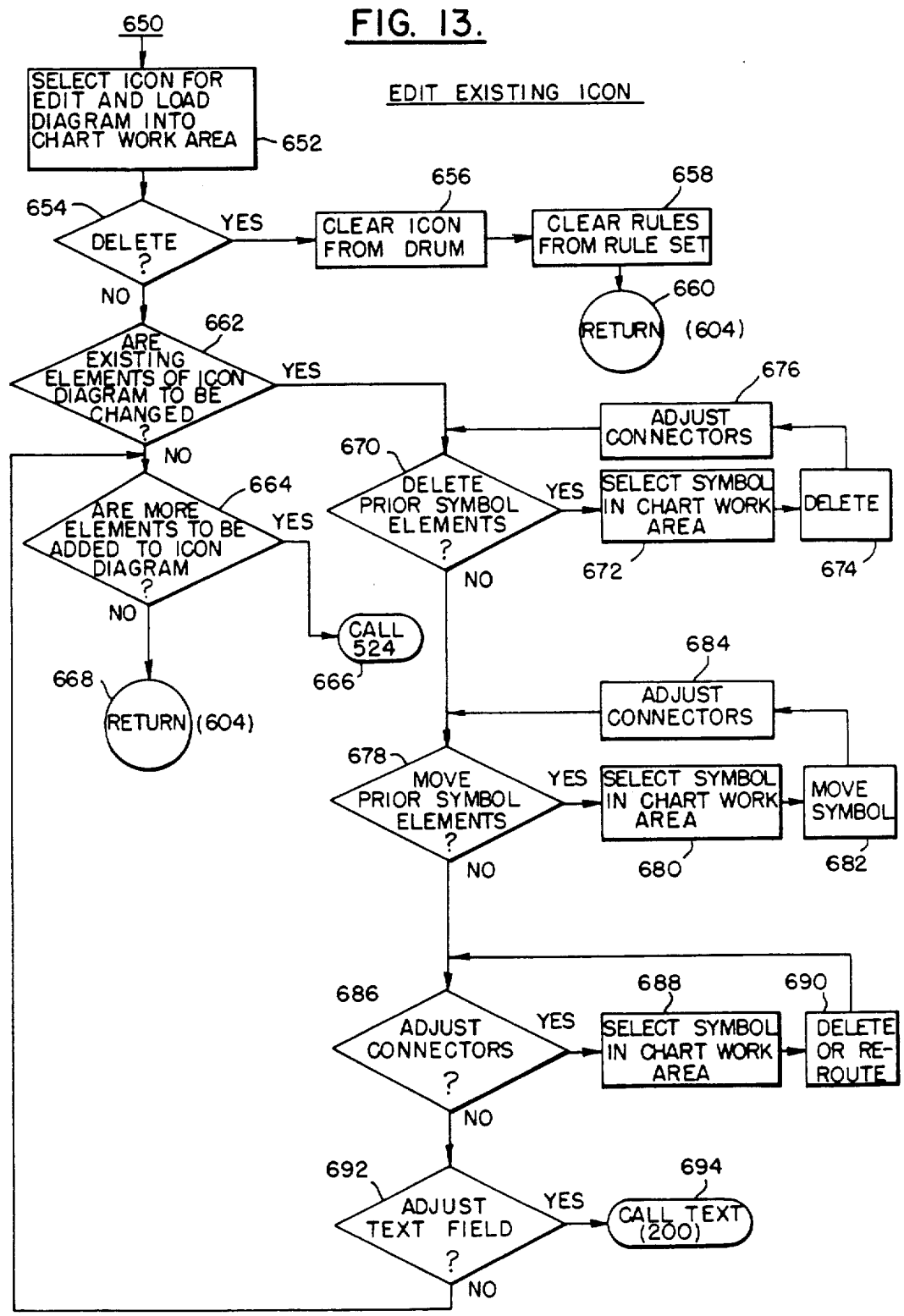
FIG. 13 is a flow chart of the procedure for editing an existing icon.

Turning to FIG. 13, upon entry to the "edit existing icon" routine at 650, control passes to box 652 and the methodology designer is instructed to select the icon to be edited and to load the diagram for that icon into the chart work area. Control then proceeds to box 654 and the methodology designer is asked whether it is desired to delete the icon which has been loaded into the chart work area. If so, control passes to box 656 and the icon to be deleted is cleared from the icon drum. At box 658, the rules associated with the deleted icon are cleared from the set of rules pertaining to the icon drum. Box 660 then returns control to box 604 of the "modify existing icon drum" routine shown in FIG. 12.

If, at box 654, the methodology designer indicates that the icon is not to be deleted, then control passes to box 662 which prompts the methodology designer to determine if existing elements of the icon diagram present in the chart work area are to be changed. If so, control passes to box 670 where the methodology designer is required to indicate if prior symbol elements are to be deleted. If deletion of symbol elements is desired, control passes to box 672 and the methodology designer selects the symbol to be deleted from the chart work area. At box 674, the symbol is deleted, and at box 676 any necessary connector adjustments are made to the remaining portions of the icon. This loop continues until all necessary prior symbol elements have been deleted.

Once the methodology designer is finished deleting any prior symbol elements, control passes to box 678 and the methodology designer is prompted to indicate if he intends to move prior symbol elements. If so, control passes to boxes 680, 682, and 684 where the symbol elements to be moved are selected, moved, and connectors are adjusted as necessary. This loop will continue until all necessary movement of prior symbol elements has been completed.

After moving any prior symbol elements, control passes to box 686 so that connector adjustments can be made. At box 688, the symbol for a connector to be adjusted is selected in the chart work area, and at box 690 the connector is deleted or rerouted. When all connectors have been adjusted, control passes to box 692 where text fields are adjusted. The adjustment of text fields is accomplished at box 694 by calling the text subroutine shown in FIG. 4.

Once necessary text field adjustments have been made, control passes to box 664 where the methodology designer is prompted to determine if more elements are to be added to the icon diagram. Box 664 is also accessed if, at box 662, the methodology designer indicates that existing elements of the icon diagram are not to be changed. If the methodology designer indicates at box 664 that more elements are to be added to the icon being worked on, then control passes to box 666 and the "create icon" routine shown in FIG. 11 is accessed at box 524. The "create icon" subroutine has already been discussed. Once any new elements have been added to the icon diagram, the "create icon" routine returns control to box 664. Then, box 668 returns control to box 604 of FIG. 12.

Turning back to FIG. 12, after a methodology designer has attended to any existing icons to be edited, control passes to box 608 where the rule tool prompts the methodology designer to determine if a new icon is to be added. If so, control passes to box 610 and the "create icon" routine shown in FIG. 11 is entered at 514. After any new icons have been added to the icon drum being modified, control is passed to box 612 and the methodology designer is prompted to indicate if the icon drum being modified is complete. If not, control is passed back to box 604 and the steps discussed above are repeated.

If the icon drum is complete, control passes from box 612 to box 614 where a map of the modified icon drum is stored as a graphics file. Then, at box 616 the set of rules to be associated with each icon in the modified icon drum is linked with the icon drum and stored. At box 618, the name of the modified icon drum is added to any additional function drums with which the icon drum can be used, as necessary. At box 620, control is returned from the "modify existing icon drum" routine to box 110 of FIG. 3.

After any modification of existing icon drums, control is passed from box 110 in FIG. 3 to box 112 where the methodology designer is asked if any more rule tool work is to be completed. If so, control is returned to box 104 so that additional rule tool work can be accomplished. Otherwise, control is passed to box 114 and the rule tool is exited.

Figures 15, 16:
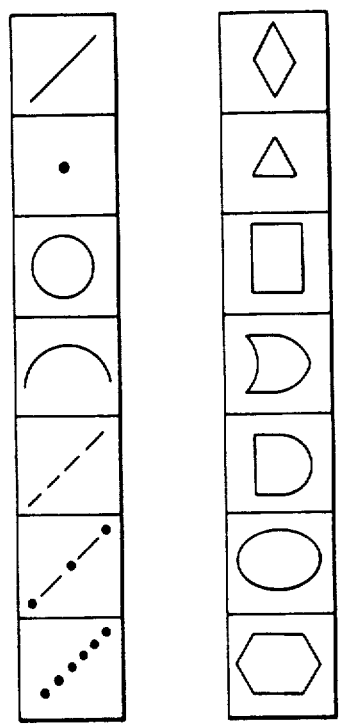
FIG. 15 is a graphical example of function primitives which are stored in the system of the present invention.
FIG. 16 is a graphical example of graphics primitives which are stored in the system of the present invention.

FIG. 15 depicts a set of functions and function primitives which can be supplied with the system to enable a methodology designer to build more complex functions as necessary. These functions are: ADD, DELETE, MOVE, COPY, FIT, SIZE, and REROUTE. Other function primitives, such as the logical "AND", "OR", and "NOT" functions could also be provided.

FIG. 16 depict an icon drum containing various graphic primitives and icons which might be supplied with a basic system in accordance with the present invention. The graphic primitives and icons supplied will enable a methodology designer to create the more complex icons necessary for use by a problem solving user in generating problem solutions. The graphic primitives and icons shown are: SOLID LINE, POINT, CIRCLE, ARC, DASHED LINE, DOT/DASH LINE, DOTTED LINE, DIAMOND, TRIANGLE, RECTANGLE, OR GATE, AND GATE, OVAL, and ELONGATED HEXAGON.

Once a methodology designer has built the set of functions and icons which are necessary to enable a problem solving user to diagram problem solutions for the application in which the problem solving user is interested, schematic drawing of problem solutions can commence. An important feature of the present invention is that during the schematic drawing process, design rule checking can be employed on a continuous basis to assure that the problem solution diagram being generated complies with all rules generated by use of the rule tool. This feature can be accomplished because the rules established for each icon or function are stored in the system, and are always retrieved along with the associated icon or function when the icon or function is selected.

The mechanisms of the schematic drawing process are precisely the same at the level of graphic arts as are those used during the sketch mode of system operation. The use of the system in the sketch mode has already been explained. The difference between the sketch mode and the schematic drawing mode is that in the former, the icons were merely general purpose graphic tokens, whereas in the latter, the icons are formal symbols within an adopted design methodology. Thus, in the schematic drawing mode all of the formal rules and procedures that are attributed to any given step of the methodology, and which can be further attributed to a graphical symbol or token of some form, will be associated with the icon on the display screen of the graphics terminal. In that way, as the problem solving user selects an icon in order to place an instance in the schematic diagram of the solution, the system in parallel, concurrently, and at a very high interactive rate, continuously checks to insure that the design rules associated with the instance of that symbol are adhered to. Thus, the logical structure of any schematic drawing created by the problem solving user as a proposed problem solution must be precisely accurate.

It will now be appreciated that the system of the present invention enables the generation of problem solutions in schematic diagram form wherein the schematic diagrams are inherently methodologically accurate. Once such a schematic diagram has been generated, it can be analyzed, classified, and transformed by other automated systems in a consistent manner to provide desired end results. Among the functions carried out by the system on the formal schematic diagram are the verification and extraction of data to ensure that all required data entry positions and all elements of the schematic diagram are in fact completed. Further, where elements of a design are characterized across several diagrams, and where those diagrams may relate to each other along connecting points thereof, then the references between the diagrams and the contexts imposed by the diagrams can be further verified and checked to insure consistency, and to insure correctness at the level of the referencing information placed in the diagram by a problem solving user. When it has been determined that a schematic diagram is complete, consistent, and internally correct with regard to the parameters and labels employed across several diagrams, then data can be extracted as a means to analyze individual schematics and the set of schematics, as a collection, to provide program description information which is entered into a program description file for subsequent use by other automated systems, such as automatic code generators, integrated circuit mask generators, etc.

It should now be understood that the present invention provides an interactive rule based system for generating problem solutions in schematic diagram form. Schematic diagrams are built from icons (graphic primitives or complex symbols) and functions (which can also comprise icons). Each icon and function to be used in building a schematic diagram representative of a problem solution has certain rules associated therewith. These rules insure that the logical structure of the schematic diagram, as a methodological description, is precisely accurate. By enforcing the rules of use for each icon and function, the system prevents a problem solving user from designing a problem solution which is inconsistent or in violation of the methodology rules. Rule enforcement is accomplished through appropriate prompts by the system during the building of a schematic diagram, and through the use of appropriate error messages when a problem solving user attempts to take an action which would break a rule.

The system further provides opportunity for a methodology designer to create a library of icons and functions tailored to the specific application in which that methodology designer is interested. Thus, while the system is general purpose, it can be converted by a methodology designer to a dedicated tool for generating problem solutions in a specific field.

An object code listing of the software which implements the sketch mode of the present system is appended hereto as a microfiche appendix. The object code shown is a hexadecimal dump of the executable program code, and can be run on a Wang Laboratories personal computer (Wang PC) with 640K bytes of memory, a 10 megabyte Winchester disk, and a mouse device manufactured by Display Interface Corporation of Milford, Connecticut under the trademark "HiFi Mouse". The Wang PC must include the Microsoft "MS DOS Version 2.01" operating system and Wang's "BIOS Version 1.21" software.

Although the present invention has been described in connection with a preferred embodiment thereof, many variations and modifications could be made. It is intended to cover all of the variations and modifications which fall within the scope of the present invention, as recited in the following claims.

I claim:

1. A general purpose interactive rule based system for generating problem solutions in schematic diagram form comprising:
   a computer processor;
   a graphics terminal coupled to said processor;
   means for providing a multi-portion split display on said graphics terminal;
   a plurality of functions and graphic primitives stored in said computer processor;
   means for creating a library of icons for an intended application by enabling a methodology designer to:
      select and arrange said graphic primitives using said graphics terminal,
      designate more than one output for an icon to couple to more than one other icon, and
      identify parameters for using each icon;
   means for generating and storing a specific set of rules pertaining to the use of each icon on the basis of the parameters identified;
   means for symbolically displaying in one portion of said split display a set of icons from said library;
   means for displaying in another portion of said split display a set of said functions; and
   means for enabling a problem solving user to access and select displayed icons and functions, and to build a solution to a problem by using functions to graphically couple icons together on a chart work area portion of said split display in accordance with said rules.

2. The system of claim 7 further comprising means for enabling a methodology designer to select and concatenate functions to each other and to icons, using said graphics terminal, to create more complex functions for display and for use in building problem solutions.

3. The system of claim 7 further comprising:
   means for analyzing icons created by a methodology designer to identify open ended connectors having no values assigned thereto; and
   means for enabling a methodology designer to assign input or output values to said open ended connectors;
   whereby said input and output values establish a transfer function across said icon, said icon and values in combination forming a new function for display and for use in building problem solutions.

4. The system of claim 7 further comprising prompting means for instructing a methodology designer to define points of connection to each icon.

5. The system of claim 4 wherein said prompting means instructs a methodology designer to indicate, for each connection point, whether the point is an input, an output, or bidirectional.

6. The system of claim 4 wherein said prompting means instructs a methodology designer to indicate for each connection point, the connector line styles which are permitted to be connected to that point.

7. The system of claim 4 wherein said prompting means instructs a methodology designer to indicate, for each connection point, the connector line types which are permitted to be connected to that point.

8. The system of claim 4 wherein said prompting means instructs a methodology designer to indicate, for each connection point, what other icons or functions are permitted to be connected, through a connector, to that point.

9. The system of claim 4 wherein said prompting means instructs a methodology designer to indicate, for each connection point:
   the connector line types which are permitted to be connected to that point;
   the connector line styles which are permitted to be connected to that point;
   whether the point is an input, an output, or bi-directional;
   what other icons or functions are permitted to be connected, through a connector, to that point; and
   whether and what type of annotation is to be associated with a connector connected to that point.

10. The system of claim 7 further comprising prompting means for instructing a user to identify any fixed and variable text and labels to be associated with each icon.

11. The system of claim 1 further comprising means for verifying that all of said rules are complied with during the building of a problem solution.

12. The system of claim 1 further comprising a mouse input device and a keyboard to enable a methodology designer or problem solving user to interface with the graphics terminal.

13. The system of claim 1 wherein the creating means also enables a methodology designer to designate more than one input for an icon to couple to more than one other icon.

14. The system of claim 1 wherein said graphic primitives include logic symbols.

15. A general purpose interactive rule based system for generating problem solutions in schematic diagram form comprising:
   a computer processor;
   a graphics terminal coupled to said processor;
   means for providing a multi-portion split display on said graphics terminal;
   a plurality of functions and graphic primitives stored in said computer processor;
   means for creating a library of icons for an intended application by enabling a methodology designer to:
      select and arrange said graphic primitives using said graphics terminal,
      designate more than one input for an icon to couple to more than one other icon, and
      identify parameters for using each icon;
   means for generating and storing a specific set of rules pertaining to the use of each icon on the basis of the parameters identified;
   means for symbolically displaying in one portion of said split display a set of icons from said library;
   means for displaying in another portion of said split display a set of said functions; and
   means for enabling a problem solving user to access and select displayed icons and functions, and to build a solution to a problem by using functions to graphically couple icons together on a chart work area portion of said split display in accordance with said rules.

* * * * *

UNITED STATES PATENT AND TRADEMARK OFFICE
CERTIFICATE OF CORRECTION

PATENT NO. : 4,813,013
DATED : March 14, 1989
INVENTOR(S) : Robert M. Dunn

It is certified that error appears in the above-identified patent and that said Letters Patent is hereby corrected as shown below:

In the first line of each of claims 2, 3, 4 and 10, change "7" to -- 1 -- .

Signed and Sealed this

Tenth Day of October, 1989

Attest:

DONALD J. QUIGG

Attesting Officer

Commissioner of Patents and Trademarks